US009832338B2

(12) United States Patent
Roberts

(10) Patent No.: US 9,832,338 B2
(45) Date of Patent: Nov. 28, 2017

(54) CONVEYANCE OF HIDDEN IMAGE DATA BETWEEN OUTPUT PANEL AND DIGITAL CAMERA

(71) Applicant: Intel Corporation, Santa Clara, CA (US)

(72) Inventor: Richard D. Roberts, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 144 days.

(21) Appl. No.: 14/641,062

(22) Filed: Mar. 6, 2015

(65) Prior Publication Data

US 2016/0261765 A1    Sep. 8, 2016

(51) Int. Cl.
*H04N 1/32* (2006.01)
*G06T 1/00* (2006.01)
*H04N 1/00* (2006.01)

(52) U.S. Cl.
CPC ....... *H04N 1/32352* (2013.01); *G06T 1/0021* (2013.01); *H04N 1/00307* (2013.01);
(Continued)

(58) Field of Classification Search
CPC ................. G06T 1/005; G06T 1/0085; G06T 2201/0064; G06T 3/4038; G06T 5/007;
(Continued)

(56) References Cited

U.S. PATENT DOCUMENTS 4,422,099 A    12/1983 Wolfe
5,319,487 A    6/1994 Sato et al.
(Continued)

FOREIGN PATENT DOCUMENTS

EP    1 436 952 A1    7/2004
EP    2 106 041 A1    9/2009
(Continued)

OTHER PUBLICATIONS

Fath et al., "Wireless data transmission using visual codes" Photon. Res. / vol. 2, No. 5 / Oct. 2014, pp. 150-160 (11 pages).
(Continued)

*Primary Examiner* — Kenny Cese
(74) *Attorney, Agent, or Firm* — Green, Howard & Mughal LLP

(57) ABSTRACT

One or more system, apparatus, method, and computer readable media is described below for conveyance of hidden image data between a display and a camera. In some embodiments, modulating a display pixel refresh rate a predetermined amount relative to a target camera frame rate conveys hidden image data. In further embodiments, a camera module is employed to detect one or more changes in state and/or logic level associated with the pixel refresh rate modulation. The logic levels are then decoded to deduce the hidden image data. In some embodiments, a visually perceptible representation of the hidden image data is then output to a output panel. For example, in one exemplary embodiment the hidden image data includes a pixel value indicative of a color that is to be output to one or more pixel of a camera viewer.

15 Claims, 13 Drawing Sheets

(52) U.S. Cl.
CPC ..... *H04N 1/32219* (2013.01); *H04N 1/32267* (2013.01); *H04N 1/32309* (2013.01); *H04N 2201/0089* (2013.01)

(58) Field of Classification Search
CPC ......... G06T 2201/0051; G06T 2201/52; G06T 1/0021; H04N 2005/91357; H04N 5/913; H04N 5/332; H04N 1/32352; H04N 1/32267; H04N 1/32309; H04N 1/32219; H04N 1/00307; H04N 2201/0089
See application file for complete search history.

(56) References Cited

U.S. PATENT DOCUMENTS

| | | |
|---|---|---|
| 5,394,259 A | 2/1995 | Takahara |
| 5,531,642 A | 7/1996 | Shiomi et al. |
| 5,577,733 A | 11/1996 | Downing |
| 5,600,471 A | 2/1997 | Hirohashi et al. |
| 5,903,373 A | 5/1999 | Welch et al. |
| 5,970,208 A | 10/1999 | Shim |
| 6,400,482 B1 | 6/2002 | Lupton et al. |
| 6,570,694 B1 | 5/2003 | Yegnanarayanan |
| 6,594,050 B2 | 7/2003 | Jannson et al. |
| 6,794,831 B2 | 9/2004 | Leeb et al. |
| 6,819,878 B1 | 11/2004 | King et al. |
| 6,941,076 B1 | 9/2005 | Adams et al. |
| 6,954,591 B2 | 10/2005 | Lupton et al. |
| 6,965,464 B2 | 11/2005 | Mossberg |
| 7,043,019 B2 | 5/2006 | Tehranchi et al. |
| 7,043,541 B1 | 5/2006 | Bechtolsheim et al. |
| 7,149,256 B2 | 12/2006 | Vrazel et al. |
| 7,415,212 B2 | 8/2008 | Matsushita et al. |
| 7,689,130 B2 | 3/2010 | Ashdown |
| 7,777,776 B2 | 8/2010 | Horiuchi |
| 7,949,259 B2 | 5/2011 | Suzuki |
| 8,070,325 B2 | 12/2011 | Zampini et al. |
| 8,238,014 B2 | 8/2012 | Kucharski et al. |
| 8,260,137 B2 | 9/2012 | Linnartz |
| 8,334,901 B1 | 12/2012 | Ganick et al. |
| 8,417,124 B2 | 4/2013 | Ford |
| 8,488,971 B2 | 7/2013 | Linnartz et al. |
| 8,494,367 B2 | 7/2013 | Linnartz |
| 8,520,065 B2 | 8/2013 | Staats et al. |
| 8,579,437 B2 | 11/2013 | Su et al. |
| 8,588,616 B2 | 11/2013 | Langer et al. |
| 8,588,621 B2 | 11/2013 | Dahan et al. |
| 8,620,165 B2 | 12/2013 | Kim et al. |
| 8,630,549 B2 | 1/2014 | Kim et al. |
| 8,665,508 B2 | 3/2014 | Kucharski et al. |
| 8,693,878 B2 | 4/2014 | Schenk et al. |
| 8,729,835 B2 | 5/2014 | Henig et al. |
| 8,737,842 B2 | 5/2014 | Schenk et al. |
| 8,818,204 B2 | 8/2014 | Roberts |
| 9,385,816 B2 | 7/2016 | Roberts et al. |
| 9,548,815 B2 | 1/2017 | Roberts |
| 2001/0055136 A1 | 12/2001 | Horiuchi et al. |
| 2002/0085094 A1 | 7/2002 | Teuchert |
| 2002/0089722 A1 | 7/2002 | Perkins et al. |
| 2002/0145776 A1 | 10/2002 | Chow et al. |
| 2002/0167701 A1 | 11/2002 | Hirata |
| 2002/0168069 A1* | 11/2002 | Tehranchi ............... G06T 1/005 380/235 |
| 2003/0053493 A1 | 3/2003 | Graham et al. |
| 2003/0081287 A1 | 5/2003 | Jannson et al. |
| 2004/0120025 A1 | 6/2004 | LeHoty |
| 2004/0161246 A1 | 8/2004 | Matsushita et al. |
| 2005/0002673 A1 | 1/2005 | Okano et al. |
| 2005/0135527 A1 | 6/2005 | Masui et al. |
| 2006/0104474 A1 | 5/2006 | Neogi |
| 2006/0204172 A1 | 9/2006 | Shahar |
| 2006/0239689 A1 | 10/2006 | Ashdown |
| 2006/0269287 A1 | 11/2006 | Bidmead et al. |
| 2007/0001950 A1 | 1/2007 | Zhang et al. |
| 2007/0177161 A1 | 8/2007 | Ishii et al. |
| 2008/0205900 A1 | 8/2008 | Cole et al. |
| 2009/0196615 A1 | 8/2009 | Kauffman |
| 2009/0208221 A1 | 8/2009 | Sasai |
| 2009/0243815 A1 | 10/2009 | Tolli |
| 2010/0060972 A1 | 3/2010 | Kucharski et al. |
| 2010/0250125 A1 | 9/2010 | Lundberg et al. |
| 2010/0271476 A1 | 10/2010 | Damink et al. |
| 2010/0309958 A1 | 12/2010 | Lakkis |
| 2011/0002695 A1 | 1/2011 | Choi et al. |
| 2011/0069971 A1 | 3/2011 | Kim et al. |
| 2011/0075581 A1 | 3/2011 | Mihota |
| 2011/0128384 A1 | 6/2011 | Tiscareno et al. |
| 2011/0144941 A1 | 6/2011 | Roberts et al. |
| 2011/0164881 A1 | 7/2011 | Rajagopal et al. |
| 2011/0274429 A1 | 11/2011 | Caplan et al. |
| 2012/0008961 A1 | 1/2012 | Chen et al. |
| 2012/0033965 A1 | 2/2012 | Zhang et al. |
| 2012/0076498 A1 | 3/2012 | Sayeed et al. |
| 2012/0099868 A1 | 4/2012 | Fischer et al. |
| 2012/0109356 A1 | 5/2012 | Kong et al. |
| 2012/0126017 A1 | 5/2012 | Sharma et al. |
| 2012/0162633 A1 | 6/2012 | Roberts et al. |
| 2012/0287286 A1* | 11/2012 | Nomura ............... G06T 3/4038 348/162 |
| 2012/0315036 A1 | 12/2012 | Kucharski et al. |
| 2013/0028609 A1 | 1/2013 | Staats et al. |
| 2013/0028612 A1 | 1/2013 | Ryan et al. |
| 2013/0126713 A1 | 5/2013 | Haas et al. |
| 2013/0129349 A1 | 5/2013 | Maxik et al. |
| 2013/0170841 A1 | 7/2013 | Liu et al. |
| 2013/0247117 A1 | 9/2013 | Yamada et al. |
| 2013/0287403 A1 | 10/2013 | Roberts |
| 2013/0301569 A1 | 11/2013 | Wang et al. |
| 2014/0003817 A1 | 1/2014 | Roberts et al. |
| 2014/0003823 A1 | 1/2014 | Roberts et al. |
| 2014/0006907 A1 | 1/2014 | Roberts et al. |
| 2014/0064739 A1 | 3/2014 | Chen et al. |
| 2014/0086587 A1 | 3/2014 | Roberts et al. |
| 2014/0086590 A1 | 3/2014 | Ganick et al. |
| 2014/0093126 A1 | 4/2014 | Roberts |
| 2014/0093234 A1 | 4/2014 | Roberts et al. |
| 2014/0093238 A1 | 4/2014 | Roberts |
| 2014/0093249 A1 | 4/2014 | Roberts et al. |
| 2014/0153668 A1 | 6/2014 | Xi et al. |
| 2014/0219663 A1 | 8/2014 | Roberts |
| 2014/0270799 A1 | 9/2014 | Roberts |
| 2014/0280316 A1 | 9/2014 | Ganick |
| 2014/0308048 A1 | 10/2014 | Roberts |

FOREIGN PATENT DOCUMENTS

| | | |
|---|---|---|
| JP | 2010-014408 A | 1/2010 |
| JP | 2010-283616 A | 12/2010 |
| JP | 5031427 B2 | 9/2012 |
| KR | 10-2006-0334883 A | 4/2006 |
| KR | 10-0761011 B1 | 9/2007 |
| KR | 10-2011-0083961 A | 7/2011 |
| KR | 10-1075747 B1 | 10/2011 |
| KR | 10-2012-0006306 A | 1/2012 |
| WO | 2008/113861 A2 | 9/2008 |
| WO | 2011/064342 A1 | 6/2011 |
| WO | 2012/037528 A2 | 3/2012 |
| WO | 2012/087944 A2 | 6/2012 |
| WO | 2013/048502 A1 | 4/2013 |
| WO | 2013/074065 A1 | 5/2013 |
| WO | 2013074065 | 5/2013 |
| WO | 2013/165751 A1 | 11/2013 |
| WO | 2014/046757 A1 | 3/2014 |
| WO | 2014/051754 A1 | 4/2014 |
| WO | 2014/051767 A1 | 4/2014 |
| WO | 2014/051768 A1 | 4/2014 |
| WO | 2014/051783 A1 | 4/2014 |

OTHER PUBLICATIONS

Daisuke, et al., "A Hybrid and Linear Registration Method Utilizing Inclination Constraint", ISMAR '05 Proceedings of the 4th IEEE/

(56) References Cited

OTHER PUBLICATIONS

ACM International Symposium on Mixed and Augmented Reality, 2005, pp. 140-149.
Horikawa, et al., "Pervasive Visible Light Positioning System using White LED Lighting", vol. 103, No. 721(CS2003 178-197), 2004, pp. 93-99.
International Search Report and Written Opinion received for PCT Patent Application No. PCT/US2013/047772 dated Sep. 27, 2013, 10 Pages.
International Search Report and Written Opinion received for PCT Patent Application No. PCT/US2011/060578, dated Mar. 15, 2012, 10 Pages.
International Search Report and Written Opinion received for PCT Patent Application No. PCT/US2013/037787, dated Aug. 12, 2013, 9 pages.
International search Report and Written Opinion received for PCT Patent Application No. PCT/US2013/047347, dated Aug. 27, 2013, 13 pages.
Tanaka, et al., "New Position Detection Method using Image Sensor and Visible Light LEDs", IEEE Second International Conference on Machine Vision, Dec. 28-30, 2009, pp. 150-153.
Wikipedia, , "Rotation Matrix", From Wikipedia, the free encyclopedia, retrieved on Nov. 1, 2012, pp. 1-22. Available at: http://en.wikipedia.org/wiki/Rotation_matrix.
Yoshino, et al., "High-accuracy Positioning System using Visible LED Lights and Image Sensor", IEEE, 2008, pp. 439-442.
International Search Report and Written Opinion received for PCT Patent Application No. PCT/US2013/047343, dated Oct. 7, 2013, 11 pages.
International Search Report and Written opinion for PCT Patent Application No. PCT/US2013/047350, dated Sep. 25, 2013, 11 Pages.
Notice of Allowance received for U.S. Appl. No. 13/460,224, dated Apr. 16, 2014, 13 pages.
Notice of Allowance received for U.S. Appl. No. 13/538,888, dated Jun. 17, 2014, 11 pages.
Notice of Allowance received for U.S. Appl. No. 13/539,354, dated Apr. 1, 2014, 5 pages.
Office Action received for U.S. Appl. No. 13/625,361, dated Jul. 31, 2014, 11 pages.
International Preliminary Report on Patentability and Written Opinion received for PCT Patent Application No. PCT/US2011/054441, dated Apr. 10, 2014, 8 pages.
International Search Report and Written Opinion received for Patent Application No. PCT/US2011/054441, dated Apr. 23, 2012, 11 pages.
International Preliminary Report on Patentability and Written Opinion received for PCT Patent Application No. PCT/US2011/060578, dated May 30, 2014, 6 pages.
International Search Report received for PCT Patent Application No. PCT/US2013/046224, dated Sep. 16, 2013, 3 pages.
Corrected Notice of Allowability for U.S. Appl. No. 13/977,696 dated Aug. 7, 2015, 2 pages.
Corrected Notice of Allowability for U.S. Appl. No. 13/977,696 dated Jul. 21, 2015, 4 pages.
Final Office Action for U.S. Appl. No. 14/210,390 dated Apr. 27, 2016, 13 pages.
International Search Report and Written Opinion for International Patent Application No. PCT/US2016/016421, dated Jun. 3, 2016, 14 pages.
Non-Final Office Action for U.S. Appl. No. 13/977,696 dated Oct. 23, 2015, 6 pages.
Non-Final Office Action for U.S. Appl. No. 14/210,390 dated Aug. 11, 2015, 14 pages.
Notice of Allowance for U.S. Appl. No. 13/977,696 dated Jun. 22, 2015, 7 pages.
Notice of Allowance for U.S. Appl. No. 13/977,696 dated Mar. 4, 2016, 5 pages.
International Preliminary Report on Patentability received Sep. 21, 2017 for U.S. Patent Application No. PCT/US16/16421.

* cited by examiner

| SFD 415 | Hidden Image Data 420 |

FIG. 4A

| 2 Frames HiRate Tone 415A | 2 Frames "1" Tone 415B |

| 3 Frames HiRate Tone 415C | 2 Frames "1" Tone 415B |

| 4 Frames HiRate Tone 415D | 2 Frames "1" Tone 415B |

| 2 Frames HiRate Tone 415A | 4 Frames Illegal Tone 415E |

FIG. 4B

| SFD 415 | ID Field 416 | Data Delimiter 417 | Hidden Image Data 420 |

FIG. 4C

| | |
|---|---|
| Anchor Pixel | SFD 415 |
| Data Pixel | 1 bit Hidden Image Data 421 |

FIG. 4D

| Hidden Image Data 430 | Output Pixel Color 440 |
|---|---|
| 00 | Pixel Value 1 |
| 01 | Pixel Value 2 |
| 10 | Pixel Value 3 |
| 11 | Pixel Value 4 |

FIG. 4E

CONVEYANCE OF HIDDEN IMAGE DATA BETWEEN OUTPUT PANEL AND DIGITAL CAMERA

BACKGROUND

A digital camera is a component often included in commercial electronic media device platforms. Digital cameras are now available in wearable form factors (e.g., video capture earpieces, video capture headsets, video capture eyeglasses, etc.), as well as embedded within smartphones, tablet computers, and notebook computers, etc.

A digital display is a component often employed to convey visual representations of media content to end-users. A digital display includes a plurality of addressable picture elements (pixels) that are spatially arrayed to form a output panel. Depending on the display technology, each pixel element may comprise a valve or light source to output visual representations of the media content.

Given the ubiquitous nature of digital cameras and digital displays, systems that can synergistically leverage their respective capabilities to a greater extent can provide a user with enhanced entertainment and utility experiences.

BRIEF DESCRIPTION OF THE DRAWINGS

The material described herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements. In the figures:

FIG. 4A, 4B, 4C, 4D, 4E illustrate hidden image data encoding structures, in accordance with some embodiments;

DETAILED DESCRIPTION OF EXEMPLARY EMBODIMENTS

Figure 1A:
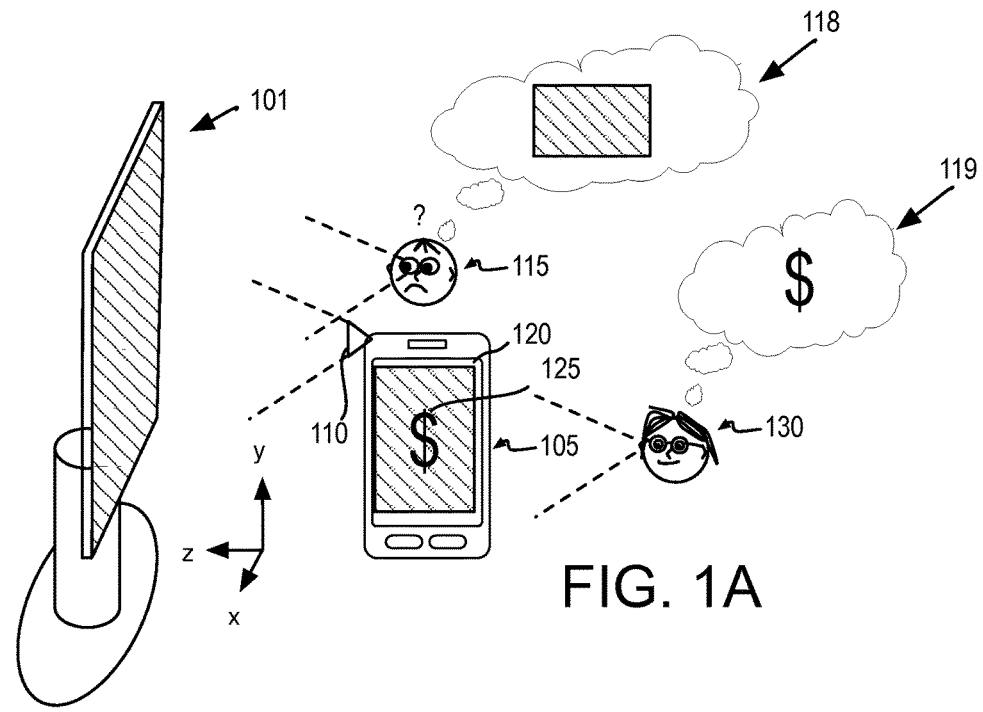
FIGS. 1A and 1B are schematics depicting a conveyance of hidden image data between a display and a camera, in accordance with some embodiments.

One or more embodiments are described with reference to the enclosed figures. While specific configurations and arrangements are depicted and discussed in detail, it should be understood that this is done for illustrative purposes only. Persons skilled in the relevant art will recognize that other configurations and arrangements are possible without departing from the spirit and scope of the description. It will be apparent to those skilled in the relevant art that techniques and/or arrangements described herein may be employed in a variety of other systems and applications beyond what is described in detail herein.

Reference is made in the following detailed description to the accompanying drawings, which form a part hereof and illustrate exemplary embodiments. Further, it is to be understood that other embodiments may be utilized and structural and/or logical changes may be made without departing from the scope of claimed subject matter. Therefore, the following detailed description is not to be taken in a limiting sense and the scope of claimed subject matter is defined solely by the appended claims and their equivalents.

In the following description, numerous details are set forth, however, it will be apparent to one skilled in the art, that embodiments may be practiced without these specific details. Well-known methods and devices are shown in block diagram form, rather than in detail, to avoid obscuring more significant aspects. References throughout this specification to "an embodiment" or "one embodiment" mean that a particular feature, structure, function, or characteristic described in connection with the embodiment is included in at least one embodiment. Thus, the appearances of the phrase "in an embodiment" or "in one embodiment" in various places throughout this specification are not necessarily referring to the same embodiment. Furthermore, the particular features, structures, functions, or characteristics described in the context of an embodiment may be combined in any suitable manner in one or more embodiments. For example, a first embodiment may be combined with a second embodiment anywhere the particular features, structures, functions, or characteristics associated with the two embodiments are not mutually exclusive.

As used in the description of the exemplary embodiments and in the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items.

As used throughout the description, and in the claims, a list of items joined by the term "at least one of" or "one or more of" can mean any combination of the listed terms. For example, the phrase "at least one of A, B or C" can mean A; B; C; A and B; A and C; B and C; or A, B and C.

The terms "coupled" and "connected," along with their derivatives, may be used herein to describe functional or structural relationships between components. It should be understood that these terms are not intended as synonyms for each other. Rather, in particular embodiments, "connected" may be used to indicate that two or more elements are in direct physical, optical, or electrical contact with each other. "Coupled" may be used to indicated that two or more elements are in either direct or indirect (with other intervening elements between them) physical, optical, or electrical contact with each other, and/or that the two or more elements co-operate or interact with each other (e.g., as in a cause an effect relationship).

Some portions of the detailed descriptions provide herein are presented in terms of algorithms and symbolic representations of operations on data bits within a computer memory. Unless specifically stated otherwise, as apparent from the following discussion, it is appreciated that throughout the description, discussions utilizing terms such as "calculating," "computing," "determining" "estimating" "storing" "collecting" "displaying," "receiving," "consolidating," "generating," "updating." or the like, refer to the action and processes of a computer system, or similar electronic computing device, that manipulates and transforms data represented as physical (electronic) quantities within the computer system's circuitry including registers and memories into other data similarly represented as physical quantities within the computer system memories or registers or other such information storage, transmission or display devices.

While the following description sets forth embodiments that may be manifested in architectures, such system-on-a-chip (SoC) architectures for example, implementation of the techniques and/or arrangements described herein are not restricted to particular architectures and/or computing systems, and may be implemented by any architecture and/or computing system for similar purposes. Various architectures employing, for example, multiple integrated circuit (IC) chips and/or packages, and/or various computing devices and/or consumer electronic (CE) devices such as set-top boxes, smartphones, etc., may implement the techniques and/or arrangements described herein. Further, while the following description may set forth numerous specific details such as logic implementations, types and interrelationships of system components, logic partitioning/integration choices, etc., claimed subject matter may be practiced without such specific details. Furthermore, some material such as, for example, control structures and full software instruction sequences, may not be shown in detail in order not to obscure the material disclosed herein.

Certain portions of the material disclosed herein may be implemented in hardware, for example as logic circuitry in an image processor. Certain other portions may be implemented in hardware, firmware, software, or any combination thereof. At least some of the material disclosed herein may also be implemented as instructions stored on a machine-readable medium, which may be read and executed by one or more processors (graphics processors and/or central processors). A machine-readable medium may include any medium and/or mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical, or other similarly non-transitory, tangible media.

Exemplary systems, methods, and computer readable media are described below for optical camera communication. In some embodiments, hidden image data is conveyed between a display and a camera. As further described herein, some embodiments leverage high camera sensor cutoff frequencies and high frequency display pixel refresh capabilities, both of which may be well above the response time of the human eye. In some embodiments, hidden image data is conveyed by frequency modulating a display pixel output amplitude by a predetermined amount relative to a target camera image sensor frame rate. The information conveyed is referred to herein as "hidden" or "indirect" image data because modulation encoding of the information may render the image data imperceptible with the naked eye. In further embodiments, a camera module is employed to detect one or more changes in state and/or logic level of a display pixel associated with the frequency shift modulation in pixel amplitude output. The logic levels are then decoded to deduce the hidden image data. In some embodiments, the hidden image data is indicative of a color that is to be output to one or more pixel of the camera viewer display. In further embodiments, a receiving device having logic to decode detected pixel output frequency shift modulation into a visual representation of the hidden data. The device further includes a output panel to output to a user the visual representation of the hidden data conveyed by a display that may otherwise be hidden from plain view.

Figure 1B:
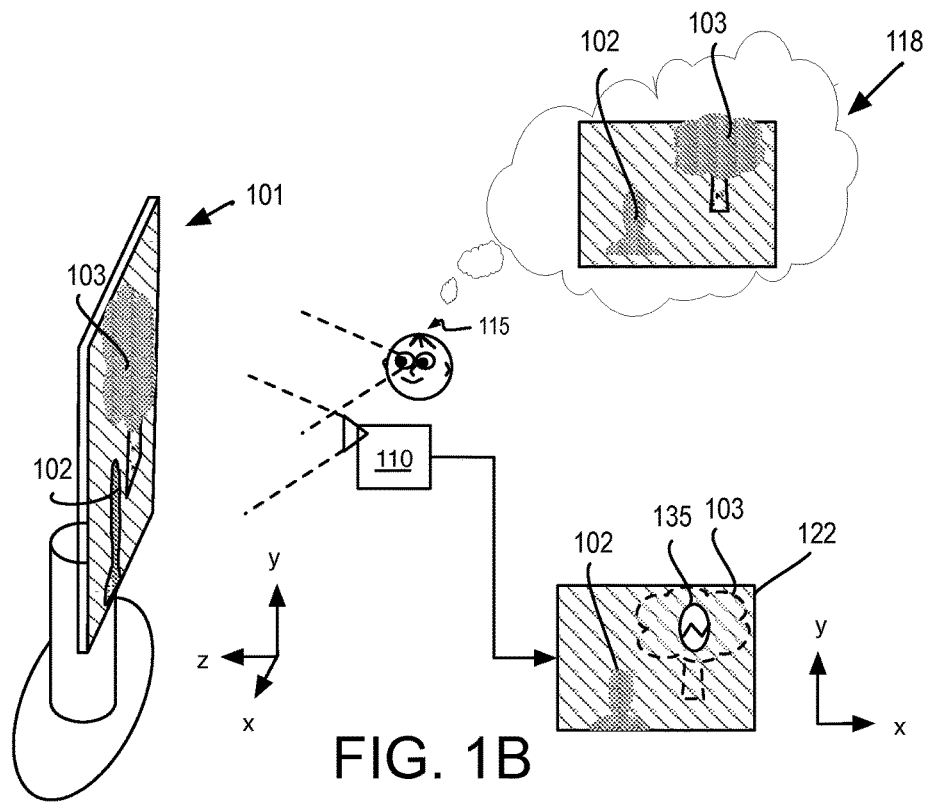

FIGS. 1A and 1B are schematics depicting a conveyance of hidden image data between a display and a camera, in accordance with some embodiments. The conveyance includes an originating or transmitting (Tx) source display and a receiver (Rx) camera. The camera may be hosted by a platform that is to perform image signal processing of the camera output, for example as configured by camera communications application software, to receive hidden image data. In some exemplary embodiments, the camera is embedded in a mobile device (e.g., smartphone camera).

Referring first to FIG. 1A, transmission display 101 may be configured for general illumination of a space (e.g. a ceiling light), or for media content display, or both. Display 101 includes a plurality of pixels spatially arrayed, for example over a 2-D (xy) display plane. Each display pixel may comprise a plurality of light valves or light sources. In one exemplary embodiment, display 101 employs light emitting diode (LED) technology. In some embodiments, one or more of the display pixels may be cycled between "high" and "low" output amplitude states. Modulation in a "high," "low" "high" sequence of states is referred to herein as a "pixel refresh." Thus, between two consecutive "high" output amplitude states, which may output a same or different source display pixel color, light output is at a significantly lower amplitude during the pixel "low" state. In some embodiments, a pixel is "on" during the pixel high amplitude state, and is "off" during the pixel low amplitude state. In other embodiments, a pixel may be classified as remaining "on" during both high and low output amplitude states.

Where each LED display pixel includes a red, green, and blue (RGB) diode, for example, voltages applied to all three diodes to output a given pixel color value (e.g., blend of RGB channels) vary between pixel high (e.g., on) and low (e.g., off) states. In other embodiments, display 101 employs an alternate display technology that is also compatible with conveyance of hidden data through camera communication. For example, any other display having controllable on/off or high/low states may be adapted to be discernable by a camera for conveyance of hidden image data by pixel refresh frequency shift modulation (i.e., "keying") based on one or more of the embodiments described herein in the context of the exemplary LED display.

In some embodiments the pixel cycling, or pixel refreshing, may be associated with a panel refresh. A panel refresh is generally associated with a vertical blanking interval (VBI) during which time a frame buffer may be flipped so that pixel on state values are changed with the panel refresh. In some embodiments where the pixel refreshing is associated with the panel refresh, one or more LEDs are placed in the off state during the VBI such that a pixel refresh tracks with the panel refresh. For such embodiments, the panel refresh rate may then be modulated for the (additional) purpose of conveying hidden image data. Thus, in addition to varying a panel refresh rate for any conventional purpose (e.g., display power consumption control, display brightness control, image frame tearing and/or stutter mitigation), a panel refresh rate may be further modulated as a means of conveying hidden image data in accordance with embodiments herein.

In other embodiments, pixel refreshing for conveyance of hidden image data is independent of a panel refresh. Likewise, pixel refreshing may be independent of frame buffer flips. For example, where a display is driven without any VBI and pixels of a display remain in an "on" state even while a frame buffer is flipped, the pixels may be independently cycled between "high" amplitude output and "low" amplitude output states as needed for purpose of conveying hidden image data in accordance with embodiments herein. A rate of frame buffer flipping between an output image frame defining "low" state pixel values and a pixel refresh frame defining "low" state pixel values may be modulated in a controlled manner, for example by a graphics pipeline, to encoded hidden image data.

Depending on the wavelength of electromagnetic radiation output (generated or reflected) by display 101, the output of display 101 may, or may not, be visually perceptible with an unaided eye. For example, in some embodiments, light within the visible band is output by display 101. In a first of such embodiments, all pixels of display 101 output a same color, such as, but not limited to white. User 115 then perceives only a uniformly lit white panel, typical of a flat panel illumination application. In other embodiments, light outside of the visible band is output by display 101. In some such embodiments, display 101 outputs light in the near infrared band spanning wavelengths that cannot be seen by the unaided human eye. User 115 then perceives display 101 to be dark (black) or uniformly unlit. In still other embodiments, various pixels with display 101 switch between a first state where light within the visible light spectrum is output and a second state where light outside of the visible light spectrum is output. For example, at any given time a first subset of pixels in display 101 output visible light (e.g., white) while a second subset of pixels in display 101 output light in the near infrared band. The display pixel population included in the first and second subsets may change over time such that user 115 perceives only noise, or snow, on display 101.

For some embodiments where display 101 outputs light within the visible band, various pixels of display 101 may output different colors, for example covering any color space gamut, to generate a visual representation of one or more first image frame having various graphic objects, textures, etc. For example, as further illustrated in FIG. 1B, display 101 outputs a first image including graphic objects 102 (e.g., an avatar) and 103 (e.g., a tree). User 115 has a perception 118 of viewing a conventional media (e.g., still image or video) display including objects 102 and 103.

In some embodiments, a display modulates a pixel amplitude modulation rate (refresh frequency) of one or more display pixel to encode hidden output data. Referring to FIGS. 1A and 1B, display 101 is to modulate a pixel refresh frequency of one or more pixel by a predetermined amount relative to a target camera frame rate. In one example, pixels are refreshed at approximately one half the nominal video frame rate of camera 110, to encode hidden image data. In some further embodiments, the minimum pixel refresh rate of one or more display pixel is above the response cutoff of an unaided human eye (e.g., at least 80 Hz, and advantageously 100 Hz, or more). With the minimum pixel refresh rate of display 101 above the human eye response cutoff of 90-100 Hz, a user's perception 118 may be unaffected by the pixel output amplitude modulation rate. However, even where a pixel is refreshed at some rate below the human eye response cutoff, a user may perceive a pixel output modulation as a mere flicker in display 101.

A camera communication (CamCom) receiver device 105 includes a digital camera 110, which is to sample the output from display 101. Camera 110 includes an optical sensor having a response cutoff advantageously well above a maximum refresh rate employed by display 101. Many commercially available camera sensors have cutoff frequencies of ~1 kHz, or more. Camera 110 may record a video of the display over multiple pixel refresh cycles (and potentially multiple panel refreshes and/or frame buffer flips). During this time, camera 110 is to detect variations or shifts in the pixel output amplitude modulation rate of one or more pixels in display 101.

Receiver device 105 includes one or more processor responsible for processing images output by camera 100. In some embodiments, a programmable processor executes camera communication application software to configure an imaging processing pipeline capable of decoding hidden image data encoded within the pixel output amplitude modulation variation. During operation, the image-processing pipeline generates one or more output image frame including graphic 125. Light output (generated or reflected) by receiver device display 120 includes a visual representation of graphic 125 generated based on the hidden image data. The visual representation of graphic 125 output by display 120 is perceptible by an unaided eye of user 120. User 120 therefore has an enhanced perception 119 resulting from the camera-based communication with display 101.

In some embodiments further illustrated by FIG. 1B, one or more output image frame 122 generated by an image processing pipeline based on output from camera 110 may include a graphic 135 that is to be further stored and/or displayed as image data that was hidden behind object 103 directly visible to user 115. As such, various image data that is directly perceptible by user 115 may be combined with hidden image data to arrive at a CamCom based output image frame 122.

In the exemplary embodiments described in detail herein, hidden image data is data employed by an image processing pipeline to construct an image other than what is directly output through color values of the originating (source) display. In some such embodiments, the hidden image data includes information on how to modify the color pixel values output by the originating display to generate a derivative image visible to a user. Hence, where display pixels output a first set of colors (e.g., first set of RGB channel values), modulation of the pixel refresh rate encodes information for an image processing pipeline to generate second set of colors (e.g., a second set of RGB channel values) for storage or display downstream of the receiving device. Notably however, the techniques described herein for covert conveyance of image data may be applied to convey non-image data including any manner of messages.

Figure 2A:
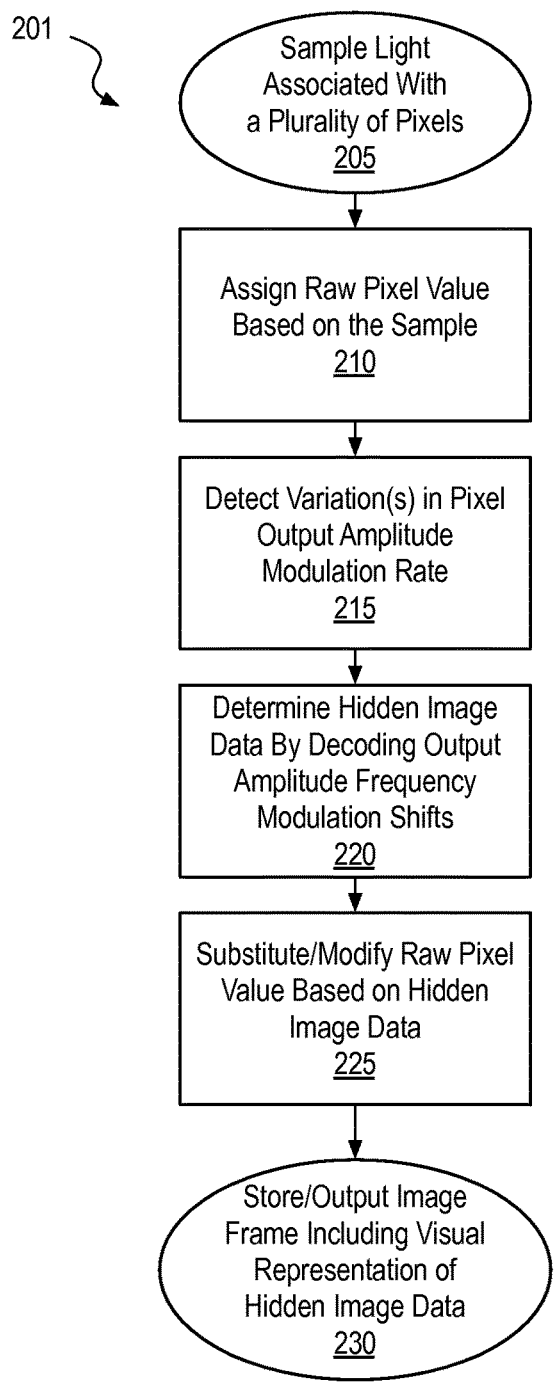
FIG. 2A is a flow diagram illustrating a method of receiving hidden image data, in accordance with some embodiments.
Figure 2B:
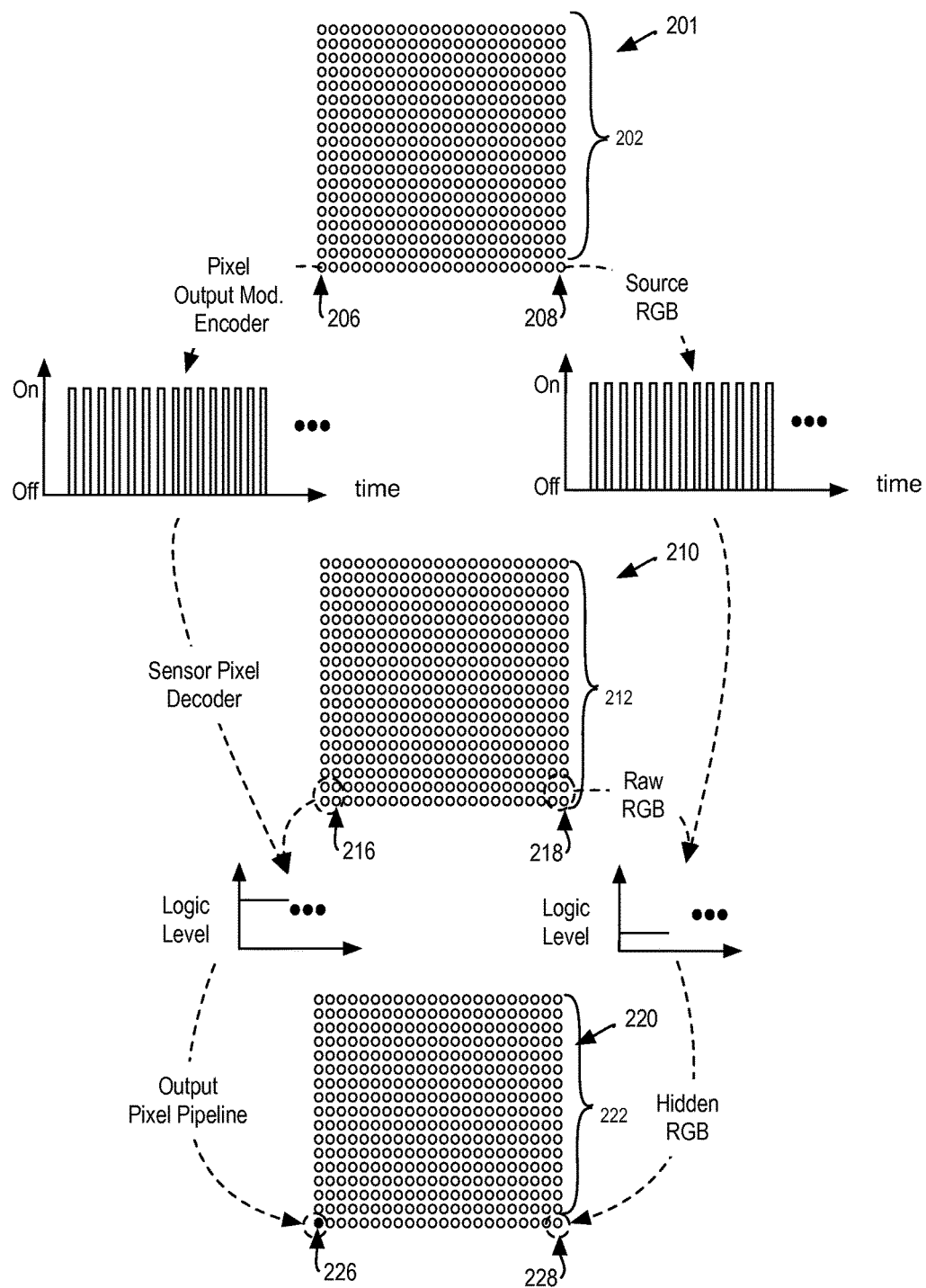
FIG. 2B is a schematic depicting substitution of a first pair of sensed pixel colors with a second pair of pixel colors to be stored or displayed, in accordance with some embodiments.

FIG. 2A is a flow diagram illustrating a method 201 for substituting visible image data with hidden image data, in accordance with some embodiments. FIG. 2B is a schematic depicting substitution of a first pair of source pixel colors with a second pair of output pixel colors to be stored or displayed, in accordance with some implementations of method 201.

Referring first to FIG. 2A, method 201 begins at operation 205 where source electromagnetic radiation (e.g. light) is sampled with an image sensor known to be sensitive to the relevant wavelength (i.e., light detector). The sampled source light(s) is associated with one or more pixel refresh frequency that is a function of the transmitting light source(s). As described further below, in some embodiments the source light pixel refresh frequency is associated with some predetermined output amplitude modulation (i.e., blinking) of one or more source lights.

Figure 3A:
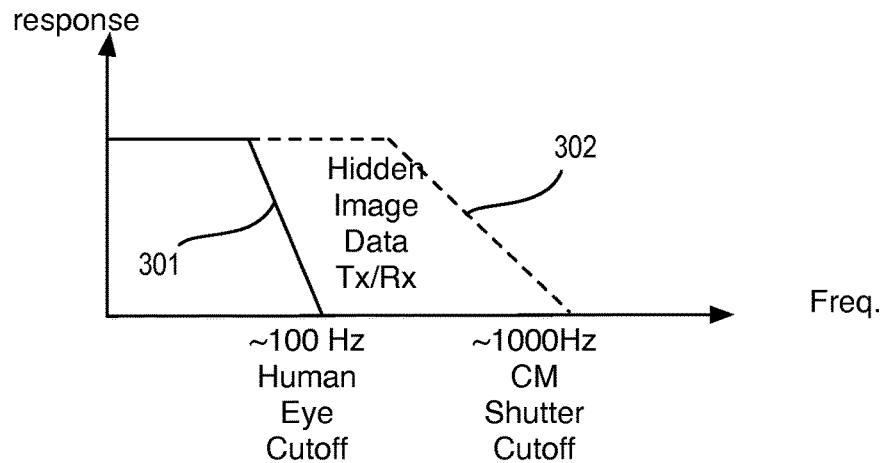
FIG. 3A is a graph illustrating a frequency response curves delineating a pixel value encoding space, in accordance with some embodiments.

In exemplary embodiments, the light sampling sensor employed at operation 205 is an optical camera image sensor sensitive over at least a portion of the visible light band. The sensor can also be further sensitive in the near infrared band, etc. In some embodiments, the image sensor includes a plurality of sensor pixels spatially arrayed over a 2-D camera sensor array. One or more pixel photodetector associated with each sensor pixel is to generate a signal proportional to a light intensity that is integrated and held during a scanning over the sensor array. Photodetectors have very high detection bandwidth (e.g., >hundreds of kHz). Under sufficient illumination, the integration times for an optical image sensor may be sufficiently short (e.g., 500 µs-5 ms) for the camera shutter cutoff frequency to greatly exceed the response frequency of the human eye. As further illustrated in FIG. 3A, camera communication techniques described herein may encode hidden image data (e.g., substitute pixel values) within the frequency range between the human eye response curve 301 (e.g., cutoff at ~100 Hz) and the camera image sensor response curve 302 (e.g., shutter cutoff frequency at ~100 Hz). Operational spaces outside of the curves illustrated in FIG. 3A may also be acceptable depending on the application.

In some embodiments, the sensor employed at operation 205 is of sufficient resolution to resolve pixilation of the source light. In other words, a subset of sensor pixels may be spatially correlated with a subset of source illumination pixels. As further illustrated in FIG. 2B for example, an image sensor 210 includes a plurality of sensor pixels 212 that are able to resolve display pixels 202. One or more first sensor pixels 216 are illuminated by one or more first source display pixels 206, while one or more second sensor pixels 218 are illuminated by one or more second source display pixels 208.

Returning FIG. 2A, method 201 continues at operation 210 where a raw sensor pixel value is assigned based on the image sensor sampling. Outputs from sensor pixels are spatially mapped to a 2-D image frame. For example, a raw image data value in an RGB color space may be output for each sensor pixel location. In exemplary embodiments, where the sensor can resolve source light pixels, there is a correlation between source pixel color and the raw pixel value output for a sensor pixel. In further reference to FIG. 2B for example, one or more first sensor pixels 216 output a raw pixel value based on the color output by one or more source pixels 206.

Returning to FIG. 2A, method 201 continues with operation 215 where variations in the rate of source light amplitude modulation (i.e., pixel refresh frequency) are detected. For embodiments where the image sensor can resolve source light pixels, an image sensor at operation 215 may sample many pixel refresh frequencies concurrently. In further reference to FIG. 2B for example, one or more first sensor pixels 216 may detect first pixel refresh frequency modulation shifts associated with one or more source pixels 206, while one or more second sensor pixels 218 may detect second pixel refresh frequency modulation shifts associated with one or more second source pixels 208. The bandwidth of multiple-input/multiple output (MIMO) transmission of hidden image data therefore depends at least on the resolution of the source, resolution of the image sensor, camera optics, and the stand-off distance between the source and the sensor. The hidden image data transmission bandwidth of each resolvable source pixel is characterized further below.

Source light output amplitude modulation frequency shift may be detected at operation 215 (FIG. 2A) by any known technique. In some embodiments, source light is subsampled by the image sensor and a state of one or more source pixel at each sampling is determined. With a source light switching at proper frequency relative to camera frame rate, an image sensor may differentiate between source pixel ON-OFF (HIGH-LOW) keying frequencies. In some embodiments, frequency shift keying (FSK) is employed to encode hidden image data. Undersampling a digital waveform can result in alias components. Aliasing will occur in method 201 where the pixel refresh rate is greater than one half the video camera frame rate (fps). For exemplary embodiments where source display pixel refresh rate and the camera frame rate satisfy this condition, hidden image data may be conveyed by the technique more particularly referred to as Undersampled Frequency Shift On-Off Keying (UFSOOK). Nevertheless, method 201 may still be practiced with pixel refresh rate is less than ½ FPS. For example, given a camera frame rate of 30 FPS, the following pixel refresh rates are all legitimate: 0 Hz and 15 Hz; 15 Hz and 30 Hz; 30 Hz and 45 Hz; 45 Hz and 60 Hz; 60 Hz and 75 Hz; 75 Hz and 90 Hz; 90 Hz and 105 Hz; 105 Hz and 120 Hz; etc. For frequencies <~100 Hz, a flicker in the source light may be perceptible to a human viewer. A source light operating with a noticeable flicker however is not necessarily disadvantageous. For example, a flicker might inform a user that the source display is sending a hidden image, prompting the user to invoke a CamCom device. Advantageous aliasing of the source light occurs if the image sensor sampling rate is below the source refresh frequency.

In embodiments where aliasing occurs, the resulting undersampled image artifacts are utilized to decode the source light output amplitude frequency modulation. For source light switching in excess of 100 Hz, the image sensor sampling may be at a frequency below 100 Hz. In some embodiments, a camera image sensor sampling rate is fixed, for example to generate a fixed number of frames/second (e.g., 30 FPS). In other embodiments, the image sensor sampling rate is variable, for example to generate 15-60 FPS as a function of a sampling frame rate controller. In further embodiments, an external signal or user notification indicates what sampling frequency the image sensor should be controlled to, either automatically or through a user interaction, to effectively alias a source pixel refresh frequency down to a lower frequency.

Figure 3B:
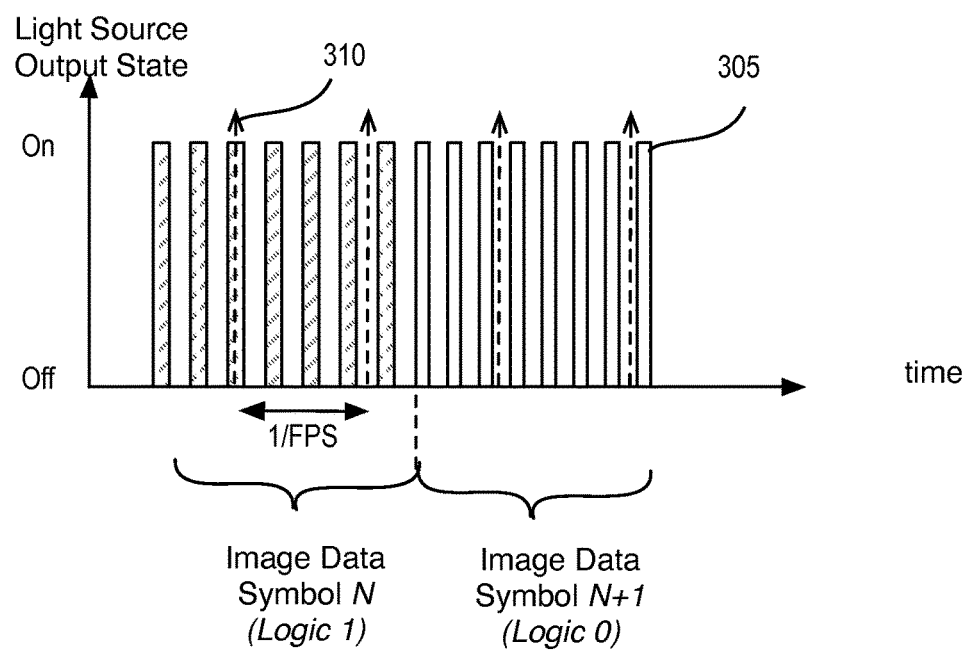
FIG. 3B, 3C, 3D are a timing diagrams illustrating a decoding of logic levels based on display pixel refresh frequency shift modulation, in accordance with some embodiments.
Figure 3C:
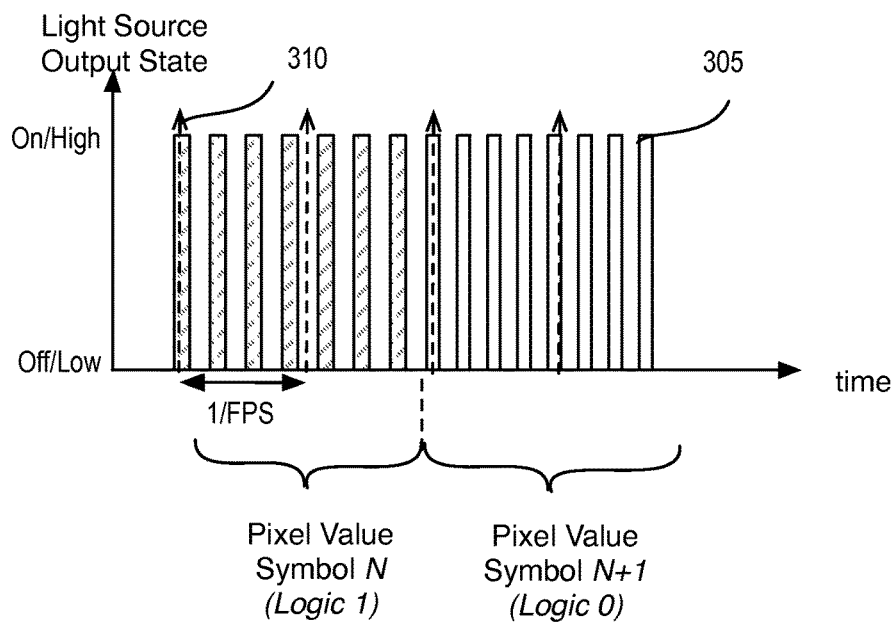
Figure 3D:
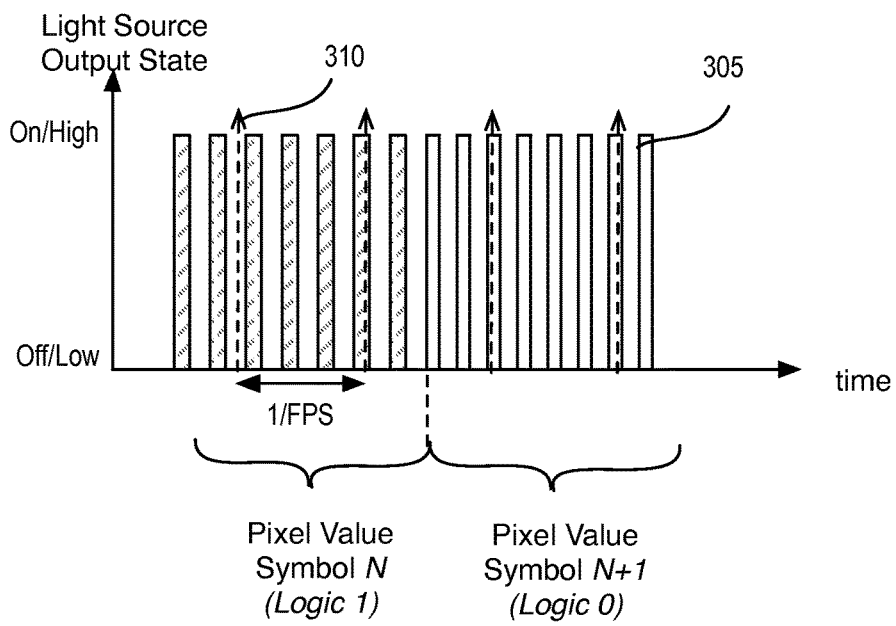

FIG. 3B-3D are timing diagrams illustrating a decoding of logic levels based on display pixel output amplitude frequency shift modulation, in accordance with some embodiments. In FIG. 3B, source pixel output digital waveforms 305 represent image symbols N and N+1 during two consecutive symbol intervals. An image sensor samples waveforms 305 at sampling strobes 310. Sampling occurs at regular time intervals of 1/FPS and may have arbitrary phase. As depicted in FIG. 3B, symbol N is associated with a first waveform frequency. Symbol N+1 is associated with a second waveform frequency. At the first pixel output amplitude modulation frequency, 7 source light pixel LOW/HIGH transitions (6 pixel refreshes) occur during the symbol interval. At the second pixel output amplitude modulation frequency, 8 source light pixel LOW/HIGH transitions (7 pixel refreshes) occur during the symbol interval. As there are two samples per bit, the image data bit rate conveyed by frequency shift modulation is one half the sample rate, or 15 bit/sec for a 30 FPS camera. In the example shown in FIG. 3B, the source pixel output amplitude modulation frequency varies between 3.5× and 4× the camera frame rate (e.g., 105 Hz and 120 Hz for a 30 FPS camera). Other pixel output amplitude modulation frequencies and camera frame rate combinations may also be used.

In the event of aliasing, the rapidly refreshing source pixels appear to the camera image sensor as slowly changing state. As shown in FIG. 3B, light is sampled as ON(High), OFF(Low), OFF(Low), OFF(Low) at strobes 310. Thus, where pixel output waveform 305 has the first frequency (e.g., 105 Hz), an image sensor pixel senses the light as toggling ON(High) and OFF(Low) with every frame (i.e., cycling at 15 FPS). In some embodiments, changing of source pixel light output state within the symbol interval encodes a first logic level (e.g., a logic 1). Where the pixel output waveform 305 has the second frequency (e.g., 120 Hz), an image sensor pixel senses the light output as having a constant state (e.g., remains off in FIG. 3B). In some embodiments, a constant light output state within the symbol interval encodes a second logic level (e.g., a logic 0). FIG. 3C and FIG. 3D illustrate other examples with different sampling phases. As shown in FIG. 3C, pixel light output is sampled as ON(High), OFF(Low), ON(High), ON(High), which may again encode a first logic level (e.g., logic 1) followed by a second logic level (e.g., logic 0). As shown in FIG. 3D, pixel light output is sampled as OFF(Low), ON(High), ON(High), ON(High), which may again encode a first logic level (e.g., logic 1) followed by a second logic level (e.g., logic 0). In exemplary embodiments where spatial resolution of the camera is sufficient to resolve separate source pixels, a stream of logic levels from each source pixel may be decoded in this manner.

Returning to FIG. 2A, method 201 proceeds to operation 220 where hidden image data is determined by decoding pixel output amplitude modulation frequency shifts. With the ability to detect variations in source pixel refresh rates, raw data output by a camera module may be processed to decode a stream of logic levels as a function of the pixel refresh frequency shift modulation. With the above encoding, the decoding rule applied at operation 220 is to generate a first logic level (logic 1) in response to the source pixel output changing state during a bit time, and is to generate a second logic level (logic 0) in response to the source pixel output remaining in the same state during the bit time.

In further embodiments, any known error correction (e.g., FEC) algorithms may be applied to compensate for phase drift, edge sampling error, and the like. In further embodiments, hidden image data conveyed by pixel refresh frequency shift modulation may be organized into data frames by adding a suitable start frame delimiter (SFD). As with asynchronous protocols (e.g., RS232, etc.), the SFD helps synchronicity between source pixel output modulation and sensor pixel sampling. Any known SFD data structure may be used to establish bit timing. A simple hidden image data frame is illustrated in FIG. 4A where the SFD field 415 demarks the beginning of an epoch and the payload 420 includes a hidden image data symbol transmitted during the epoch. FIG. 4B further illustrates exemplary implementations of SFD according to some embodiments. As shown, the SFD may include a high frequency pixel refresh portion 415A (e.g., two frames) during which the camera sees the pixel as being both on and off. In the exemplary two bit embodiments, the first bit of the SFD is sent at a frequency well beyond the response time of an image sensor typical to an application (e.g., smartphone). The pixel integrator will then extract an average light intensity of half on. The second portion of the SFD 415B includes the next two frames of a logic 1 sent to determine if source pixel and sensor pixel are sufficiently in sync. If a logic 0 is read instead, the frame can be discarded. FIG. 4B further illustrates alternative SFD structures suitable for time hopping (e.g., with a three frame first portion 415C), a long SFD (e.g., with a four frame first portion 415D), and a data delimiter (e.g., with a four frame second portion 415E comprising an illegal or null frequency).

FIG. 4C further illustrates hidden image data code packet structure in accordance with some embodiments. Any given pixel of an originating display may output packets having the illustrated structure. In the exemplary space-time code packet, a data delimiter 417 separates SFD 415 (e.g., normal SFD 415A/415B) and the hidden image data 420. In further embodiments employing spatial multiplexing, the code packet includes an ID field 416 associated with the payload. ID field 416 may be utilized in MIMO embodiments to tag spatially multiplexed payloads. ID field 416 may, for example, identify one or more pixel location, or a range of locations, within an image frame for which the hidden image data 420 is applicable. ID field 416 may provide a basis for mapping between a source pixel location within a display frame and an output image pixel location. FIG. 4D further illustrates hidden image data code packet structure in accordance with spatially coded embodiments. Any given pair of source display pixels resolvable by an image sensor may together convey first and second data packets specifying hidden image data and one or more pixel location to which the hidden image data is to be applied. In some embodiments, one or more first pixels convey SFD 415 (e.g., long SFD 415D/415B) while one or more second pixels convey a quantum (e.g., 1 bit) of hidden image data 421. Multiple second pixels may be employed to concurrently transmit many bits of hidden image data. For example, where each of a plurality of second pixels repeatedly transmits a bit from one assigned spatial position, the bits may together transmit "spatially coded" multi-bit hidden image data.

Returning to FIG. 2A, method 201 continues at operation 225, where the hidden image data encoded in one or more of the logic levels is mapped to a pixel value of an output image frame. In some embodiments, the hidden image data is substitution information utilized in the construction of an output image. A raw pixel value associated with a pixel location for which the hidden data is associated is substituted or modified based on the substitution information. In exemplary embodiments, pixel value substitution information is indicative of an output color that should be generated, stored, and/or displayed as a processed camera output frame. This output frame is then a visual representation of the camera communicated hidden image data that is stored and/or displayed on a camera viewer display at operation 230.

In exemplary embodiments where spatial resolution of the camera is sufficient to resolve separate source pixels, the encoded hidden data may be mapped to determine the output color to be displayed on all image sensor pixel locations illuminated by the particular source pixel sending the information. In further reference to FIG. 2B for example, many or all of the plurality of source display pixels 202 undergo a refresh frequency modulation (e.g., switching between high and low output amplitude states) of variable frequency to encode pixel-level hidden image data. A hidden image data decoder then determines distinct logic level streams associated with one or more sensor pixels 212. Sensor pixels 216 and 218, for example, are illuminated by source pixels 206 and 208, respectively. Pixel-level hidden image data messages are then mapped to corresponding pixel locations within an output image frame 220.

FIG. 2B illustrates one exemplary embodiment where a color indicated by a source pixel output amplitude modulation frequency shift is displayed at pixel locations mapped to image sensor pixels illuminated by the source pixel that is refresh frequency modulated. However, many other spatial mappings between source pixel locations and output image pixel locations are possible. For the illustrative example, refresh frequency modulation at a first source pixel location (e.g., pixel 208) illuminates a first sensor pixel location (e.g., pixel 218) and may encode a color to be displayed at a second pixel location (e.g., pixel 226) that is different from the source and sensor pixel locations. In some embodiments, ID fields included in the hidden image data code packet provide spatial mapping for the hidden image data.

As further illustrated in FIG. 2B, raw RGB values output by sensor 210 associated with one or more pixel locations may be replaced or modified based on the hidden image data associated with the one or more pixel locations. For the illustrated embodiment, raw RBG data associated with image sensor pixel(s) 218 illuminated by source display pixel(s) 208 is replaced with hidden RGB data transmitted by pixel output amplitude modulation frequency shifting of source pixel(s) 208 at corresponding pixel locations within display 220. Display pixel(s) 228 therefore have a color (e.g., set of RGB channel values) that is determined by a pixel refresh frequency shift of source display 201. For some embodiments therefore, the payload field of a hidden image data packet includes a code that indicates what pixel color value(s) is(are) to be assigned to a particular pixel and/or pixel location within an output image frame. FIG. 4E illustrates a mapping between a hidden image data field 430 and an output pixel color 440, in accordance with some embodiments. In this illustrative example, first hidden image data 00 is mapped to a pixel value 1, (e.g., black, green, blue, red, white, etc.). More complex codes utilizing a greater number of hidden data bits may be devised to provide any desired range of color definition.

Figure 5:
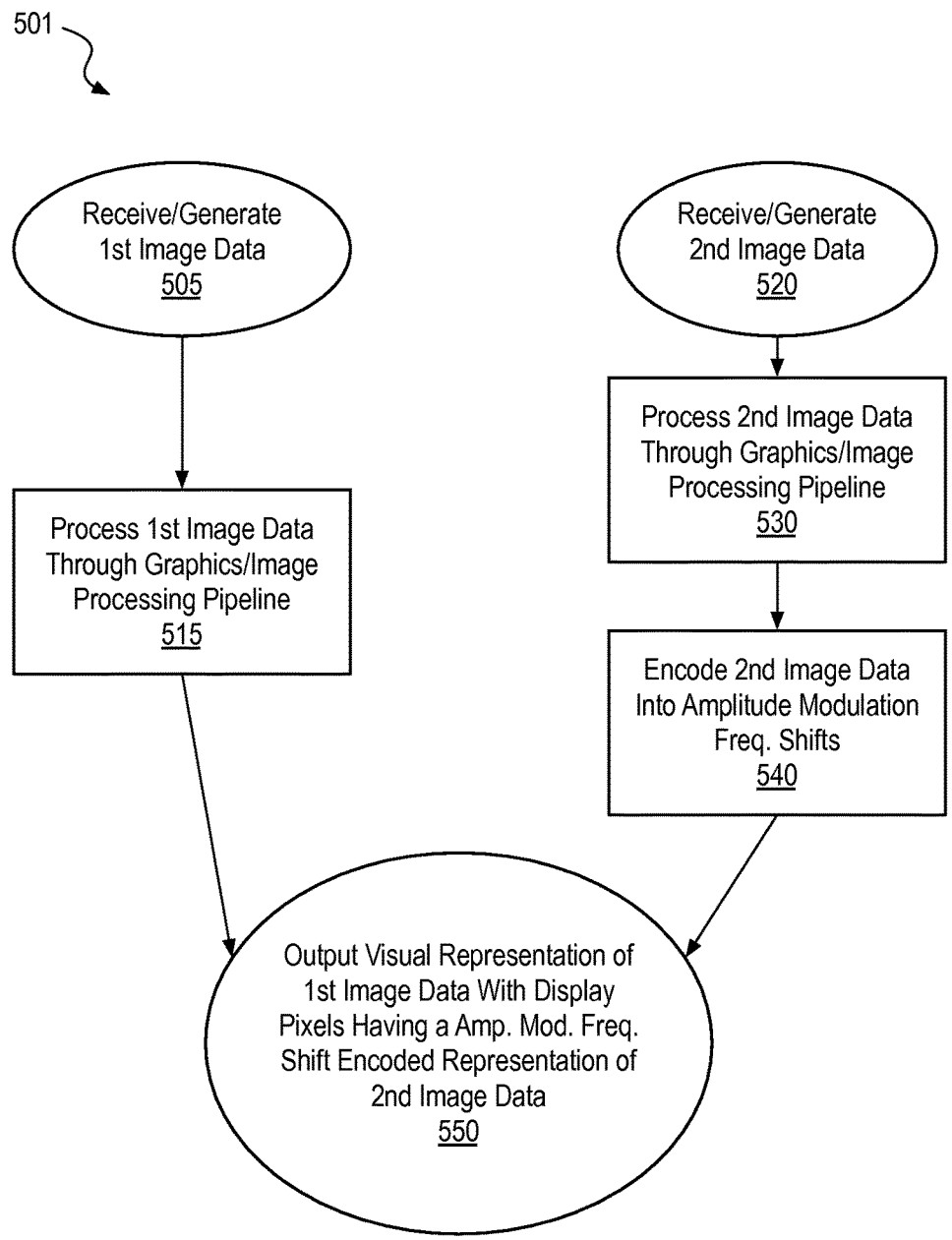
FIG. 5 is a flow diagram illustrating a method of optically transmitting hidden image data, in accordance with some embodiments.

FIG. 5 is a flow diagram illustrating a method 501 for optically transmitting hidden image data in a manner suitable for camera communication. In some embodiments, method 501 is performed by a source device platform that includes a source display (e.g., display 101 in FIG. 1A). Method 501 begins with receiving or generating first image data at operation 505. The first image data is to be the basis of one or more overt image frames visually presented as a first portion of the output from method 501. The first image data may be in any suitable form, such as but not limited to primitive data, vertex data, pixel data, etc. Second (hidden) image data is further received or generated at operation 520. The second image data is to be the basis of one or more covert image frames encoded as a second portion of the output from method 501. The second image data may be in any suitable form, such as but not limited to primitive data, vertex data, pixel data, etc.

At operation 515, the first image data is processed through any known graphics and/or image processing pipeline. For example, first image data including primitives may be processed through one or more of a vertex shader, geometry shader, texture sampler, and pixel renderer. In one exemplary embodiment, a graphics pipeline generates one or more "high" state pixel values for each of one or more pixel positions within a first data output frame. The first image data generated may be stored to an image frame buffer as a first output image frame. At operation 530, the second image data is processed through any known graphics and/or image processing pipeline. For example, second image data including primitives may be processed through one or more of a vertex shader, geometry shader, texture sampler, and pixel renderer to arrive at hidden image data consisting of substitute pixel color values.

At operation 540 the hidden image data, is encoded into a pixel refresh frequency modulation. A modulator of any suitable configuration may perform the refresh frequency shift modulation described above. In exemplary embodiments, a plurality of output signals, each associated with one or more pixel of an output panel, are modulated independently at varying frequency as a function of the second image data. Pixel refresh frequency modulation is implemented by hardware embedded within a display. Such hardware may entail circuitry to control voltages of individual display pixels. In some embodiments, graphics pipeline capabilities are exploited to control switching between output image frame(s) representing one or more "high" pixel values, and reference image frame(s) representing one or more "low" pixel values. In one exemplary embodiment, a graphics pipeline generates one or more "low" state pixel values, such as but not limited to black (e.g., RGB 0,0,0), for each of one or more pixel positions within a hidden data reference output frame. The one or more reference output frame may be interleaved with the first data output frame(s) to modulate the output amplitude of various pixels. The frequency of this modulation may then be varied to encode the hidden image data generated at operation 530. In some embodiments, a frame buffer controller is to control flipping between the one or more hidden data reference output frame and a buffer frame generated at operation 515. The apparent pixel refresh frequency rate of particular pixels is then defined by the rate image frame buffer flips and the difference in the pixel values between an image frame generated at operation 515 and the hidden data reference output frame.

At operation 550, a visual representation of the first image data is output, for example by a plurality of spatially arrayed display pixels, using any known technique. In some embodiments, each of the plurality of pixels includes one or more LED. One or more of the display pixels are refreshed based on the plurality of output signals generated operation 540. One frame of first image data is output at operation 550, for example as a still image or as a portion of a time consecutive sequence (i.e., video). While first image data is presented, output modulation of one or more of the display pixels is frequency shifted, for example by approximately one-half the frame rate of a camera standard. As one example, a 15 Hz shift modulation (e.g., between 105 Hz and 120 Hz) would be suitable for reception by a 30 FPS camera. Higher modulations (e.g., 50 Hz) would also be possible for communication with a higher speed (e.g., 100 FPS) camera. In some embodiments, a series of first image data frame(s) and hidden image data reference frame(s) are presented to modulate a pixel refresh rate associated with the first image data frame.

Figure 6A:
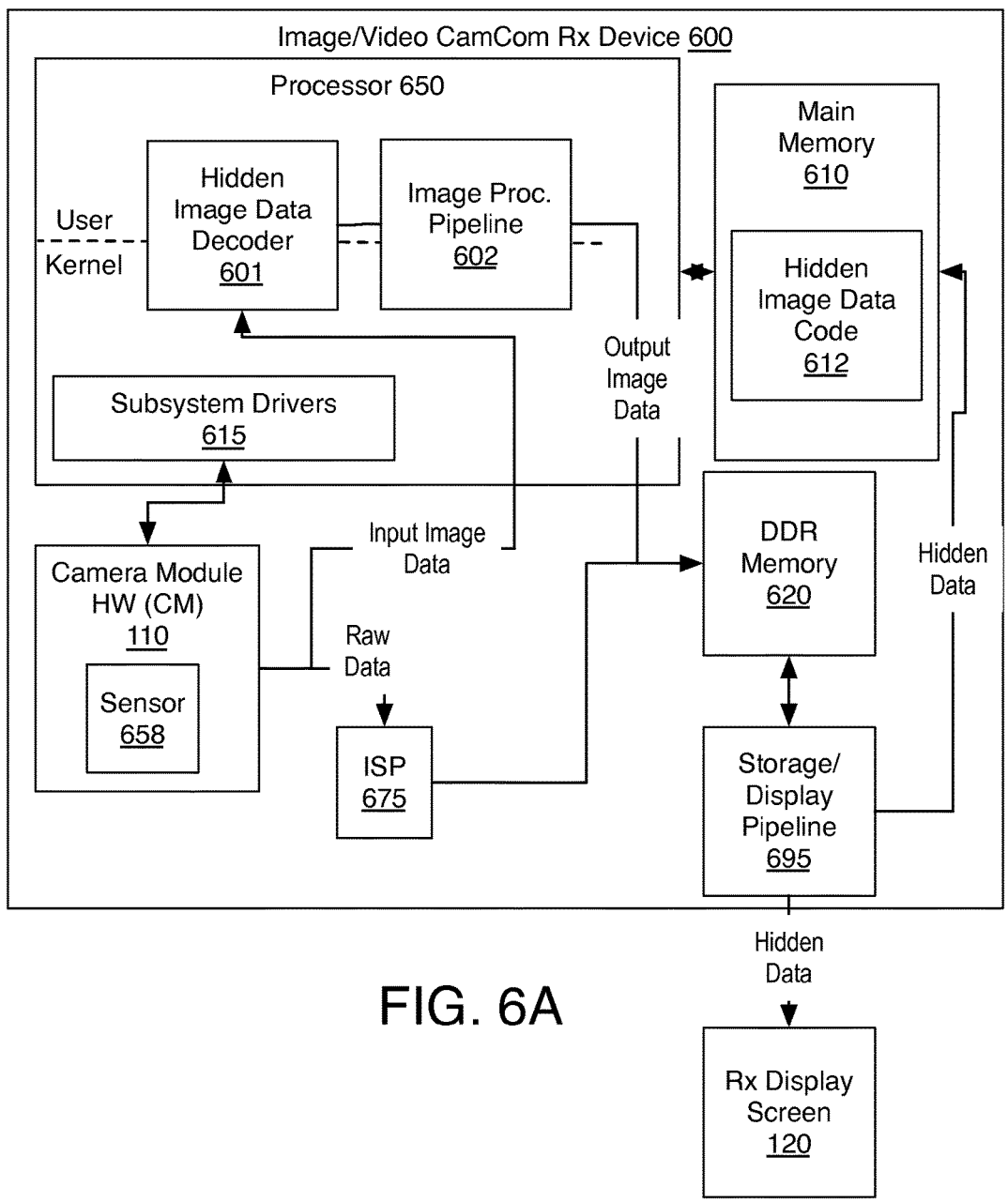
FIG. 6A is a functional block diagram of an image camera communication receiver, in accordance with embodiments.

FIG. 6A is a functional block diagram of an image/video CamCom receiver (Rx) device 600 including camera module hardware 110 and a hidden image data decoder 601, in accordance with embodiments. FIG. 6A further illustrates how a hidden image data decoder may be integrated with various other components to provide enhanced video camera output. CamCom Rx device 600 for example may be a portion of a mobile computing device platform. A mobile computing device may refer to any device having a processing system and a mobile power source or supply, such as one or more batteries, for example. Examples of a mobile computing device may include a laptop computer, tablet, touch pad, portable computer, handheld computer, palmtop computer, personal digital assistant (PDA), cellular telephone, combination cellular telephone/PDA, television, smart device (e.g., smartphone, tablet or smart television), mobile internet device (MID), messaging device, data communication device, and so forth. Examples of a mobile computing device also include computers and/or media capture/transmission devices configured to be worn by a person, such as a wrist computer, finger computer, ring computer, eyeglass computer, belt-clip computer, arm-band computer, shoe computers, clothing computers, and other wearable computers. In various embodiments, for example, a mobile computing device may be implemented as a smart phone capable of executing computer applications, as well as voice communications and/or data communications. Although some embodiments may be described with a mobile computing device implemented as a smart phone by way of example, it may be appreciated that other embodiments may be implemented using other wireless mobile computing devices as well. The embodiments are not limited in this context.

CamCom Rx device 600 includes at least one camera module (CM). In the exemplary embodiment, CM 110 further includes a camera sensor 658. Sensor 658 may be a HD, FHD, QXGA, WQXGA, QSXGA, or UHD format digital optical imaging device, for example. In one embodiment sensor 658 has at least 8-megapixel resolution. Camera sensor 658 may provide a color resolution of 8 bits, or more per pixel, is operable to capture continuous video frames progressively. Sensor 658 may have a pixel frequency of 170 MHz, or more. Camera sensor 658 may include an RGB Bayer color filter, an analog amplifier, an A/D converter, other components to convert incident light into a digital signal corresponding to raw image data. Sensor 658 may be controlled to operate a rolling shutter or electronic focal plane shutter process where pixels are read out progressively in a line-sequential fashion for a frame. In exemplary video embodiments, sensor 658 outputs multiple consecutively exposed frames. CM 110 may output raw data associated with the consecutively sampled frames in conformance with any known streaming protocol, such as a MIPI. Raw image data is input to ISP 675. ISP 675 is to receive and analyze raw image data during the horizontal and/or vertical blanking periods associated with CM 110. During raw image data processing, ISP 675 may perform one or more of color space conversion, noise reduction, pixel linearization, and shading compensation, for example.

Raw data output by CM 110 and/or pre-processed video data output by ISP 675 may be further processed to incorporate hidden image data. In the illustrated embodiment, processor 650 implements hidden image data decoder 601 and hidden image data processing pipeline 602. In some embodiments, processor 650 includes one or more (programmable) logic circuits to perform one or more stages of a method for substituting raw image data output by CM 110 with hidden image data collected by CM 110. For example, processor 650 may perform method 201 (FIG. 2A) in accordance with some embodiments described above. Subsystem drivers 615 within a kernel space of an operating system (OS) instantiated by processor 650 may communicate various camera module parameters, such as camera shutter rates, integration times, etc. in response to commands generated by a CamCom software application layer executing, for example, in the user space. In some embodiments, processor 650 is to access hidden image data codebook 612 stored in main memory 610, and is to map between detected pixel refresh frequency shift modulations and hidden image data.

In embodiments, hidden image data decoder 601 includes logic to perform the decoding operations and algorithms described elsewhere herein. In further embodiments, hidden image data processing pipeline 602 includes logic to perform one or more stages of a method for substituting raw image data with hidden image data received from decoder 601. In some embodiments, image processing pipeline logic is implemented with programmable circuitry that has been configured through software instruction(s). In some embodiments, image processing pipeline 602 includes logic to determine pixel values for a plurality of pixels of an output image frame based on decoded hidden image data received from decoder 601.

Either software or hardware implementations, or a combination thereof, are suitable for implementing one or more stages of a method for substituting raw image data output by CM 110 with hidden image data collected by CM 110. For hardware implementations, hidden data decoder 601 and/or image processing pipeline 602 may be implemented by fixed function logic, for example provided in ISP 675. For software implementations, any known programmable processor, such as a core of processor 650 or an execution unit of a graphics processor may be utilized to implement the logic of hidden image data decoder 601 and/or image processing pipeline 602. Processor 650 may be solely responsible for generating hidden image data from input image data collected by CM 110 or output from ISP 675. In one exemplary embodiment, hidden image data decoder 601 and/or hidden image data processing pipeline 602 are invoked through the user space of a software stack instantiated by processor 650. In some embodiments, processor 650 executes a hidden image data decoding algorithm instantiated in a kernel space of the software stack. In some embodiments, processor 650 is programmed with instructions stored on a computer readable media to cause the processor to perform one or more hidden image data decoding method.

As further illustrated in FIG. 6A, hidden image data may be output to storage/display/transmission pipeline 695. In one exemplary storage pipeline embodiment, output image data including decoded hidden image data is written to electronic memory 620 (e.g., DDR, etc.) to supplement and/or replace raw image data. Memory 620 may be separate or a part of a main memory 610. Alternatively, or in addition, storage/display/transmission pipeline 695 is to transmit hidden image data and/or output image data including hidden image data off CamCom Rx device 600.

Figure 6B:
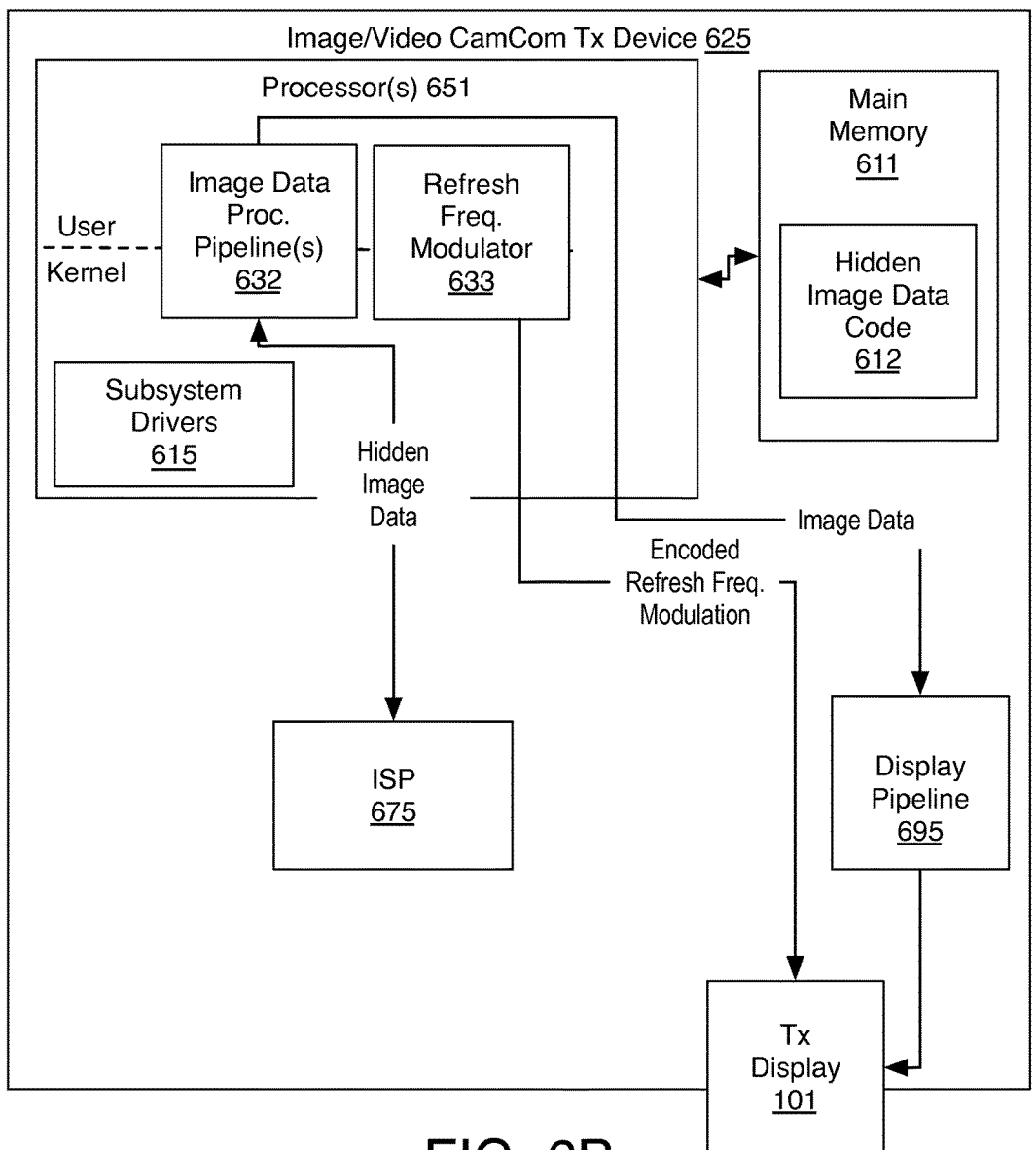
FIG. 6B is a functional block diagram of an image camera communication transmitter, in accordance with embodiments.

FIG. 6B is a functional block diagram of an image/video CamCom Tx device 625 including a display pixel output amplitude frequency shift modulator 633, in accordance with embodiments. In some embodiments, image/video CamCom Tx device 625 is to perform a method for optically transmitting hidden image data suitable for camera communication (e.g., method 501).

CamCom Tx device 625 for example may be a portion of a stationary information media device platform or a mobile computing device platform. Examples of a stationary media device platform include a large screen television, desktop computing device, a set-top box, a digital billboard or signage device, a general illumination fixture, and an automated self-service device (e.g., automated teller machine, automated digital photo kiosk, automated information terminal). In some embodiments, CamCom Tx device 625 includes a display 101, such as a flat panel LED display of any size (e.g., cm to hundreds of meters in length). In other embodiments, CamCom Tx device 625 includes only an output to communicate encoded pixel refresh frequency modulation signals suitable for coupling to an external display 101. Display 101 is coupled to an output of display pixel output amplitude modulator 633 and is to receive a shift modulation signal encoding hidden image data. In the exemplary embodiment, display 101 is further coupled to an output of image data display pipeline 695 to receive image data. Display 101 is to display a visual representation of image data received. In further embodiments, display 101 is to refresh one or more display pixels based on the received shift modulation signal. Display 101 may include pixel level addressing logic circuitry to switch one or more display pixel between LOW and HIGH states independently of one or more other display pixels. In some embodiments pixel-level refresh addressing logic circuitry is coupled to refresh frequency modulator 633.

In some embodiments, processor 651 is to generate and/or receive graphical objects and/or image (video) data to be included in an output frame(s). In the illustrated example, image data processing pipeline 632 and or ISP 675 output image data to display pipeline 695. In further embodiments, processor 651 is to generate graphical objects and/or image (video) data that is to be encoded in pixel refresh frequency modulation signals. In the illustrated example, hidden image data generated and/or received by image data processing pipeline 632 and/or ISP 675 is output to refresh frequency modulator 633, which is further to encode the hidden image data into one or more pixel-level refresh frequency shift modulations. In the illustrated embodiment, processor 651 implements refresh frequency modulator 601, as well as image data processing pipeline 632. In some embodiments, processor 651 includes one or more (programmable) logic circuits to perform one or more stages of a method for displaying image data with refresh frequency shift modulation encoded image data. For example, processor 651 may perform method 501 (FIG. 5) in accordance with some embodiments described above. Subsystem drivers 615 within a kernel space of an OS instantiated by processor 651 may communicate various display parameters, including refresh frequency shift modulation signals, in response to commands generated by a ComCam software application layer executing, for example, in the user space. In some embodiments, processor 651 is to access hidden image data codebook 612 stored in main memory 611, and is to map between hidden image data and refresh frequency shift modulations based on codebook 612.

In embodiments, refresh frequency modulator 633 includes logic to perform the encoding operations and algorithms described elsewhere herein.

Either software or hardware implementations, or a combination thereof, are suitable for implementing one or more stages of a method for displaying image data with hidden image data encoded into a refresh frequency shift modulation signal. For hardware implementations, refresh frequency modulator 633 may be implemented by fixed function logic, for example provided in ISP 675. For software implementations, any known programmable processor, such as a core of processor 651 or an execution unit of a graphics processor may be utilized to implement the logic of refresh frequency modulator 633 and/or image processing pipeline 632. Processor 651 may be solely responsible for encoding hidden image data output by display 101. In one exemplary embodiment, refresh frequency modulator 633 is invoked through the user space of a software stack instantiated by processor 651. In some embodiments, processor 651 executes a hidden image data encoding algorithm instantiated in a kernel space of the software stack. In some embodiments, processor 651 is programmed with instructions stored on a computer readable media to cause the processor to perform one or more hidden image data encoding method.

Figure 7:
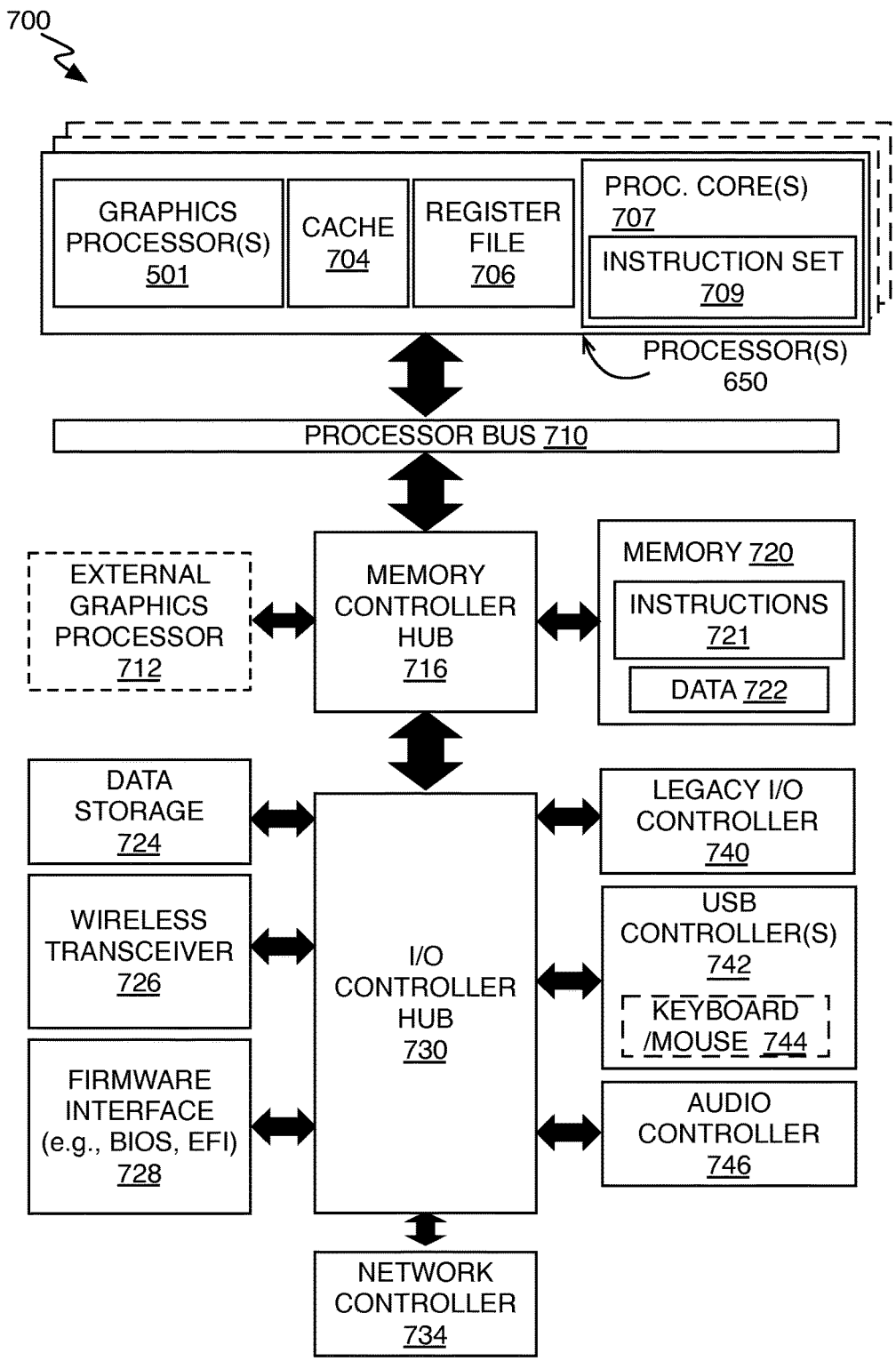
FIG. 7 is a block diagram of a data processing system, in accordance with some embodiments.

FIG. 7 block diagrams a data processing system 700 that may be utilized substitute one or more sensed pixel colors with a one or more decoded pixel colors to be stored or displayed. Data processing system 700 includes one or more processors 702 and one or more graphics processors 708, and may be a single processor desktop system, a multiprocessor workstation system, or a server system having a large number of processors 702 or processor cores 707. In on embodiment, the data processing system 700 is a system-on-a-chip (SoC) integrated circuit for use in mobile, handheld, or embedded devices.

An embodiment of data processing system 700 can include, or be incorporated within a server-based gaming platform, a game console, including a game and media console, a mobile gaming console, a handheld game console, or an online game console. In some embodiments, data processing system 700 is a mobile phone, smart phone, tablet computing device or mobile Internet device. Data processing system 700 can also include, couple with, or be integrated within a wearable device, such as a smart watch wearable device, smart eyewear device, augmented reality device, or virtual reality device. In some embodiments, data processing system 700 is a television or set top box device having one or more processors 702 and a graphical interface generated by one or more graphics processors 708.

In some embodiments, the one or more processors 702 each include one or more processor cores 707 to process instructions which, when executed, perform operations for system and user software. In some embodiments, each of the one or more processor cores 707 is configured to process a specific instruction set 709. In some embodiments, instruction set 709 may facilitate Complex Instruction Set Computing (CISC), Reduced Instruction Set Computing (RISC), or computing via a Very Long Instruction Word (VLIW). Multiple processor cores 707 may each process a different instruction set 709, which may include instructions to facilitate the emulation of other instruction sets. Processor core 707 may also include other processing devices, such a Digital Signal Processor (DSP).

In some embodiments, the processor 702 includes cache memory 704. Depending on the architecture, the processor 702 can have a single internal cache or multiple levels of internal cache. In some embodiments, the cache memory is shared among various components of the processor 702. In some embodiments, the processor 702 also uses an external cache (e.g., a Level-3 (L3) cache or Last Level Cache (LLC)) (not shown), which may be shared among processor cores 707 using known cache coherency techniques. A register file 706 is additionally included in processor 702 which may include different types of registers for storing different types of data (e.g., integer registers, floating point registers, status registers, and an instruction pointer register). Some registers may be general-purpose registers, while other registers may be specific to the design of the processor 702.

In some embodiments, processor 702 is coupled to a processor bus 710 to transmit data signals between processor 702 and other components in system 700. System 700 has a 'hub' system architecture, including a memory controller hub 716 and an input output (I/O) controller hub 730.

Memory controller hub 716 facilitates communication between a memory device and other components of system 700, while I/O Controller Hub (ICH) 730 provides connections to I/O devices via a local I/O bus.

Memory device 720 can be a dynamic random access memory (DRAM) device, a static random access memory (SRAM) device, flash memory device, or some other memory device having suitable performance to serve as process memory. Memory 720 can store data 722 and instructions 721 for use when processor 702 executes a process. Memory controller hub 716 also couples with an optional external graphics processor 712, which may communicate with the one or more graphics processors 708 in processors 702 to perform graphics and media operations.

In some embodiments, ICH 730 enables peripherals to connect to memory 720 and processor 702 via a high-speed I/O bus. The I/O peripherals include an audio controller 746, a firmware interface 728, a wireless transceiver 726 (e.g., Wi-Fi, Bluetooth), a data storage device 724 (e.g., hard disk drive, flash memory, etc.), and a legacy I/O controller for coupling legacy (e.g., Personal System 2 (PS/2)) devices to the system. One or more Universal Serial Bus (USB) controllers 742 connect input devices, such as keyboard and mouse 744 combinations. A network controller 734 may also couple to ICH 730. In some embodiments, a high-performance network controller (not shown) couples to processor bus 710.

Figure 8:
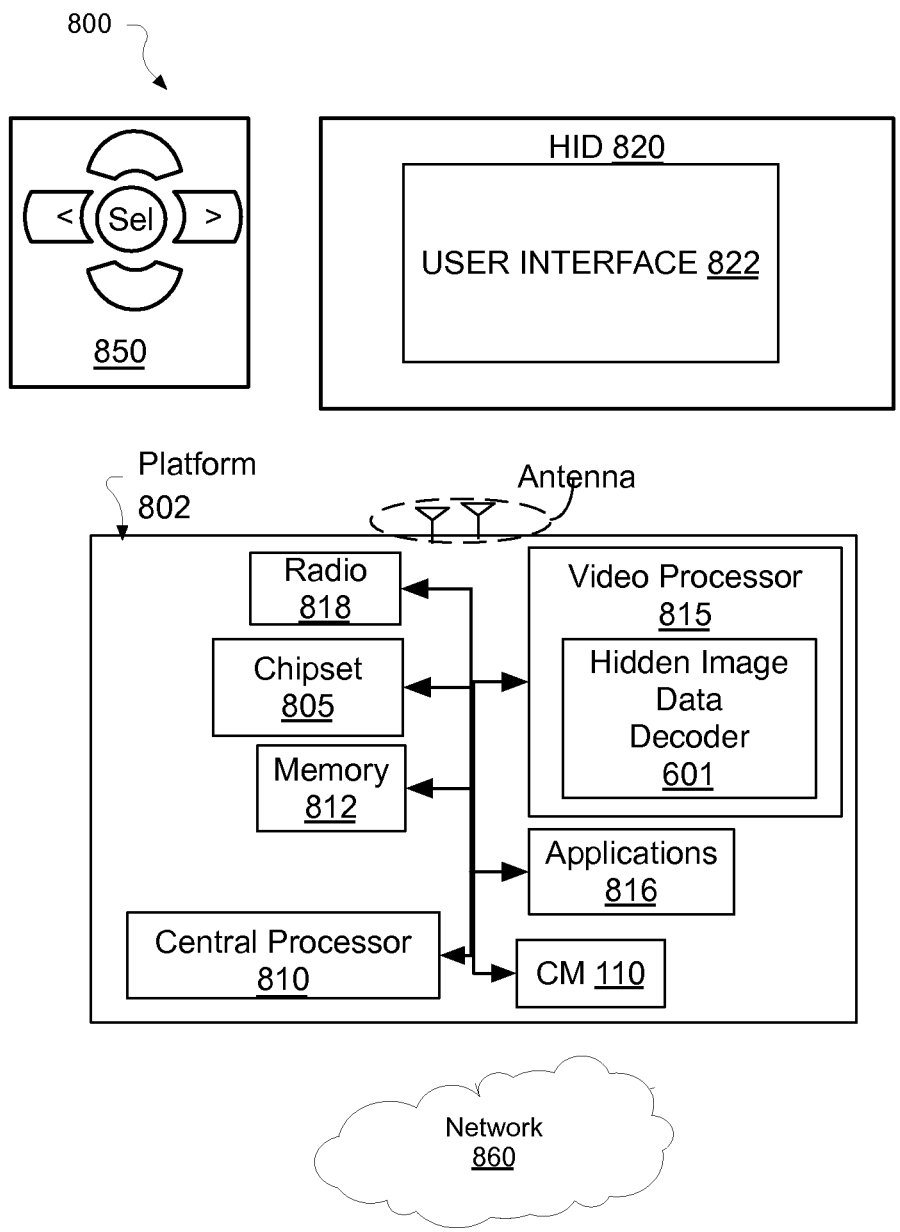
FIG. 8 is a diagram of an exemplary ultra-low power system including a hidden image data decoder, in accordance with some embodiments.

FIG. 8 is a diagram of an exemplary ultra-low power system 1000 employing an image/video CamCom Rx device, in accordance with one or more embodiment. System 800 may be a mobile device although system 800 is not limited to this context. System 800 may be incorporated into a wearable computing device, laptop computer, tablet, touch pad, handheld computer, palmtop computer, cellular telephone, smart device (e.g., smart phone, smart tablet or mobile television), mobile internet device (MID), messaging device, data communication device, and so forth. System 800 may also be an infrastructure device. For example, system 800 may be incorporated into a large format television, set-top box, desktop computer, or other home or commercial network device.

System 800 includes a device platform 802 that may implement all or a subset of the hidden image receiving and decoding methods described above in the context of FIG. 1A-FIG. 4E. In various exemplary embodiments, video processor 815 executes refresh frequency detection and/or image data decoding methods, for example as described elsewhere herein. Video processor 815 includes logic circuitry implementing hidden image data decoder 601 to decode substitute pixel values for an output image based on pixel refresh frequency shift modulation, for example as described elsewhere herein. In some embodiments, one or more computer readable media may store instructions, which when executed by CPU 810 and/or video processor 815, cause the processor(s) to execute one or more of the image data decoding and/or substitution operations described elsewhere herein. One or more image data frames output by CM 110 may then be stored in memory 812 in association with substitute image data.

In embodiments, device platform 802 is coupled to a human interface device (HID) 820. Platform 802 may collect raw image data with CM 110 and 211, which is processed and output to HID 820. A navigation controller 850 including one or more navigation features may be used to interact with, for example, device platform 802 and/or HID 820. In embodiments, HID 820 may include any monitor or display coupled to platform 802 via radio 818 and/or network 860. HID 820 may include, for example, a computer output panel, touch screen display, video monitor, television-like device, and/or a television.

In embodiments, device platform 802 may include any combination of CM 110, chipset 805, processors 810, 815, memory/storage 812, applications 816, and/or radio 818. Chipset 805 may provide intercommunication among processors 810, 815, memory 812, video processor 815, applications 816, or radio 818.

One or more of processors 810, 815 may be implemented as one or more Complex Instruction Set Computer (CISC) or Reduced Instruction Set Computer (RISC) processors; x86 instruction set compatible processors, multi-core, or any other microprocessor or central processing unit (CPU).

Memory 812 may be implemented as a volatile memory device such as, but not limited to, a Random Access Memory (RAM), Dynamic Random Access Memory (DRAM), or Static RAM (SRAM). Memory 812 may also be implemented as a non-volatile storage device such as, but not limited to flash memory, battery backed-up SDRAM (synchronous DRAM), magnetic memory, phase change memory, and the like.

Radio 818 may include one or more radios capable of transmitting and receiving signals using various suitable wireless communications techniques. Such techniques may involve communications across one or more wireless networks. Example wireless networks include (but are not limited to) wireless local area networks (WLANs), wireless personal area networks (WPANs), wireless metropolitan area network (WMANs), cellular networks, and satellite networks. In communicating across such networks, radio 618 may operate in accordance with one or more applicable standards in any version.

In embodiments, system 800 may be implemented as a wireless system, a wired system, or a combination of both. When implemented as a wireless system, system 800 may include components and interfaces suitable for communicating over a wireless shared media, such as one or more antennas, transmitters, receivers, transceivers, amplifiers, filters, control logic, and so forth. An example of wireless shared media may include portions of a wireless spectrum, such as the RF spectrum and so forth. When implemented as a wired system, system 800 may include components and interfaces suitable for communicating over wired communications media, such as input/output (I/O) adapters, physical connectors to connect the I/O adapter with a corresponding wired communications medium, a network interface card (NIC), disc controller, video controller, audio controller, and the like. Examples of wired communications media may include a wire, cable, metal leads, printed circuit board (PCB), backplane, switch fabric, semiconductor material, twisted-pair wire, co-axial cable, fiber optics, and so forth.

The hidden image data decoding and image data substitution methods comporting with exemplary embodiments described herein may be implemented in various hardware architectures, cell designs, or "IP cores."

Figure 9:
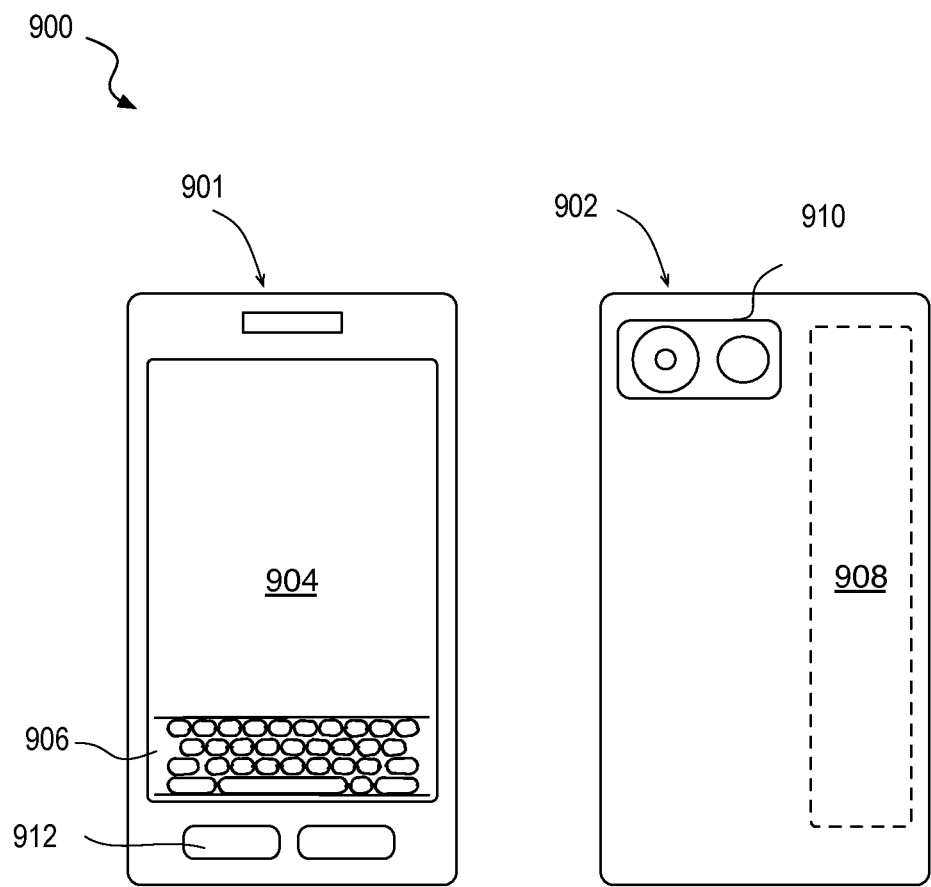
FIG. 9 is a diagram of an exemplary mobile handset platform, arranged in accordance with some embodiments.

As described above, system 800 may be embodied in varying physical styles or form factors. FIG. 9 further illustrates embodiments of a mobile handset device 900 in which platform 930 and/or system 1000 may be embodied. In embodiments, for example, device 900 may be implemented as a mobile computing handset device having wireless capabilities. As shown in FIG. 9, mobile handset device 900 may include a housing with a front 901 and back 902. Device 900 includes a display 904, an input/output (I/O) device 906, and an integrated antenna 908. Device 900 also may include navigation features 912. Display 904 may include any suitable display unit for displaying information appropriate for a mobile computing device. I/O device 906 may include any suitable I/O device for entering information into a mobile computing device. Examples for I/O device 906 may include an alphanumeric keyboard, a numeric keypad, a touch pad, input keys, buttons, switches, microphones, speakers, voice recognition device and software, and so forth. Information also may be entered into device 900 by way of microphone (not shown), or may be digitized by a voice recognition device. Embodiments are not limited in this context. Integrated into at least the back 902 is a camera module 910 (e.g., including one or more lens, aperture, and imaging sensor), through which image data is sampled and output to a hidden image data decoder, for example as described elsewhere herein.

As exemplified above, embodiments described herein may be implemented using hardware elements, software elements, or a combination of both. Examples of hardware elements or modules include: processors, microprocessors, circuitry, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software elements or modules include: applications, computer programs, application programs, system programs, machine programs, operating system software, middleware, firmware, routines, subroutines, functions, methods, procedures, software interfaces, application programming interfaces (API), instruction sets, computing code, computer code, code segments, computer code segments, data words, values, symbols, or any combination thereof. Determining whether an embodiment is implemented using hardware elements and/or software elements may vary in accordance with any number of factors considered for the choice of design, such as, but not limited to: desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable storage medium. Such instructions may reside, completely or at least partially, within a main memory and/or within a processor during execution thereof by the machine, the main memory and the processor portions storing the instructions then also constituting a machine-readable storage media. Programmable logic circuitry may have registers, state machines, etc. configured by the processor implementing the computer readable media. Such logic circuitry, as programmed, may then be understood as physically transformed into a system falling within the scope of the embodiments described herein. Instructions representing various logic within the processor, which when read by a machine may also cause the machine to fabricate logic adhering to the architectures described herein and/or to perform the techniques described herein. Such representations, known as cell designs, or IP cores, may be stored on a tangible, machine-readable medium and supplied to various customers or manufacturing facilities to load into the fabrication machines that actually make the logic or processor.

While certain features set forth herein have been described with reference to embodiments, this description is not intended to be construed in a limiting sense. Hence, various modifications of the implementations described herein, as well as other implementations, which are apparent to persons skilled in the art to which the present disclosure pertains are deemed to be within the spirit and scope of the present disclosure.

The following paragraphs briefly describe some exemplary embodiments:

In one or more first embodiments, an apparatus, comprises a camera module to sample light associated with one or more display pixels, assign a raw pixel value for one or more pixels of an input image frame based on the sample, and detect one or more variations in an output modulation rate of at least one of the display pixels. The apparatus further comprises an image processing module coupled to the camera module to determine hidden image data based on the one or more output modulation rate variations, and to generate an output image frame from the input image frame by substituting or modifying the raw pixel value based on the hidden image data.

In furtherance of the first embodiments, the image processing module is to determine one or more logic levels associated with one or more pixels of the input image frame based on the one or more pixel output modulation rate variations, and determine a hidden pixel value based on the one or more logic levels.

In furtherance of the first embodiments, the camera module is to detect the one or more pixel output modulation rate variations based on shift modulation artifacts of temporal aliasing between sampling of the light and a pixel output modulation frequency.

In furtherance of the first embodiments, the image processing module is to decode a stream of logic levels as a function of pixel output frequency shift modulation, determine a hidden pixel value encoded by the stream of logic levels, and generate the output image frame by changing the raw pixel value to the hidden pixel value.

In furtherance of the first embodiments, the apparatus further comprises at least one of an electronic memory to store the output image frame, or a output panel to output the output image frame.

In furtherance of the first embodiments, the image processing module is to decode a first logic level associated with the one or more pixels of the input image frame in response to the sampling rate being less than a pixel output modulation rate by a first amount, decode a second logic level associated with the one or more pixels of the input image frame in response to the sampling rate being less than a pixel output modulation rate by a second amount, different than the first amount.

In furtherance of the first embodiments, the camera module is to spatially map raw pixel values over a plurality of pixels comprising the input image frame. The imaging processing module is to decode one or more logical levels associated with each of the plurality pixels based on one or more variations in a pixel output modulation rate associated with each of the plurality of pixels, and generate the output image frame by replacing the raw pixel value of a first of the pixels with a hidden pixel value in response to decoding one or more first logical levels associated with the first of the pixels.

In furtherance of the embodiments immediately above, the image processing module is to retain the raw pixel value of a second of the pixels in response to decoding one or more second logical levels associated with the second of the pixels.

In one or more second embodiment, a method for determining a pixel value comprises sampling light associated with one or more display pixels, assigning a raw pixel value for one or more pixels of an input image frame based on the sample, detecting one or more variations in an output modulation rate of the one or more display pixels, determining hidden image data based on the one or more pixel output modulation rate variations, and generating an output image frame from the input image frame by substituting or modifying the raw pixel value based on the hidden image data.

In furtherance of the second embodiments, generating the output image frame further comprises decoding a stream of logic levels as a function of the pixel output modulation rate variations, determining a hidden pixel value as a function of the stream of logic levels, and generating the output image frame by changing the raw pixel value to the hidden pixel value.

In furtherance of the embodiments immediately above, determining the one or more logical levels further comprises decoding a first logic level associated with the one or more pixels of the input image frame in response to the sampling rate being less than a pixel output modulation rate by a first amount, and decoding a second logic level associated with the one or more pixels of the input image frame in response to the sampling rate being less than a pixel output modulation rate by a second amount, different than the first amount.

In furtherance of the second embodiments, assigning a raw pixel value for one or more pixels of the input image frame further comprises spatially mapping raw pixel values over a plurality of pixels comprising the input image frame. Determining hidden image data further comprises decoding one or more logic levels associated with each of the plurality pixels based on temporal aliasing between a sampling of the light and an amplitude modulation in the light associated with refreshing each of the plurality of pixels. Generating the output image frame further comprises replacing the raw pixel value of a first of the pixels with a hidden pixel value in response to decoding one or more first logical levels associated with the first of the pixels.

In furtherance of the embodiments immediately above, generating the output image frame further comprises retaining the raw pixel value of a second of the pixels in response to decoding one or more second logical levels associated with the second of the pixels.

In one or more third embodiments, an apparatus includes a means for performing any one of the second embodiments.

In one or more fourth embodiments, one or more computer readable media includes instructions stored thereon, which when executed by a processing system, cause the system to perform any one of the second embodiments.

In furtherance of the fourth embodiments, the media further includes instructions stored thereon, which when executed by a processing system, cause the system to perform a method comprising decoding a stream of logic levels as a function of the pixel output modulation rate variations, determining the hidden pixel value as a function of the stream of logic levels, and generating the output image frame by changing the raw pixel value to the hidden pixel value.

In one or more fifth embodiments, an apparatus comprises an image processing pipeline to generate an output image frame comprising a plurality of pixel locations, a display pixel output modulator to encode hidden image data associated with one or more of the plurality of pixel locations into one or more variations of a pixel output modulation rate, and an output panel, coupled to the refresh modulator and comprising a plurality of spatially arrayed pixels, to output a visual representation of the output image frame while one or more of the pixels are modulated at the pixel output modulation rate.

In furtherance of the fifth embodiments, the apparatus further comprises an image pipeline to associate a first pixel value and a second pixel value with the output image frame, the output panel is to emit light representing the output image frame based at least in part on the first pixel value, and the display pixel output modulator is to encode transmission of the second pixel value with a time varying amplitude modulation of a least a portion of the spatially arrayed pixels.

In furtherance of the fifth embodiment immediately above, the image pipeline is to associate both the first and second pixel value with a first pixel location within both the first and second image frames, one or more of the spatially arrayed pixels associated with the first pixel location is to emit light indicative of the first pixel value, and the display pixel output modulator is to encode the second pixel value by varying a rate the light emitted by one or more of the spatially arrayed pixels associated with the first pixel location is modulated.

In furtherance of the fifth embodiment immediately above, the image pipeline is to associate both a first and second pixel value for each of a plurality of pixel locations within the first and second image frames, the display pixel output modulator is to determine a plurality of logic levels indicative of the second pixel values, and the output panel pixels spatially mapped to the plurality of pixel locations are to emit light indicative of the corresponding first pixel value at different pixel output modulation rates dependent on the logic levels associated with the corresponding pixel locations.

In furtherance of the fifth embodiment immediately above, the image pipeline is to receive a first input indicative of a first graphics object, determine the first pixel value for the first pixel location based on the first input, receive a second input indicative of a second graphics object, and determine the second pixel value for the first pixel location based on the second input.

In furtherance of the fifth embodiments, in response to one or more input from the display pixel output modulator, the output panel pixels are to: emit light over a first plurality of pixel refresh cycles at a pixel output modulation rate of at least 90 Hz, and emit light over a second plurality of pixel refresh cycles at a second output modulation rate that is at least 90 Hz and is at least 10 Hz greater.

In one or more sixth embodiments, a method of optically transmitting hidden image data comprises encoding one or more pixel value for each of a plurality of pixel locations into one or more variations of a pixel output modulation rate, and outputting a visual representation of an output image frame comprising the plurality of pixel locations with a spatially arrayed plurality of pixels, one or more of which are modulated at the pixel output modulation rate.

In furtherance of the sixth embodiments, outputting the visual representation further comprises emitting light, with a plurality of spatially arrayed light sources, representing a first image frame, wherein each light source emits light amplitude modulated at a rate of at least 90 Hz but less than 1 KHz, and the encoding further comprises encoding one or more pixel value excluded from the visual representation by varying an amplitude modulation of at least some of the light sources.

In furtherance of the sixth embodiments, the encoding further comprises differentiating between a first and second logic level associated with one or more of the pixel locations by varying the pixel output modulation rate of one or more of the pixels by at least 10 Hz, and the varying of the refresh rate of at least some of the pixels encodes a plurality of shifts between the first and second logic levels indicative of the different pixel values excluded from the visual representation.

In furtherance of the sixth embodiments, both a first and second pixel value is associated with a first pixel location within the output image frame, light emitted by one or more of the pixels associated with the first pixel location is indicative of the first pixel value, and a variation in the pixel output modulation rate affecting an amplitude modulation of the light emitted by one or more of the pixels associated with the first pixel location encodes the second pixel value.

In one or more fourth embodiments, an apparatus includes a means for performing any one of the sixth embodiments.

In one or more seventh embodiments, one or more computer readable media includes instructions stored thereon, which when executed by a processing system, cause the system to perform the any of fourth embodiments.

In furtherance of the seventh embodiments, the media has instructions stored thereon, which when executed by the processing system, further cause the system to perform a method comprising outputting the visual representation with a plurality of spatially arrayed light sources, light representing the first image frame, wherein each light source emits light amplitude modulated at a rate of at least 90 Hz but less than 1 KHz, encoding one or more pixel value excluded from the visual representation by varying an amplitude modulation of at least some of the light sources.

It will be recognized that the embodiments are not limited to the exemplary embodiments so described, but can be practiced with modification and alteration without departing from the scope of the appended claims. For example, the above embodiments may include specific combination of features. However, the above embodiments are not limited in this regard and, in embodiments, the above embodiments may include undertaking only a subset of such features, undertaking a different order of such features, undertaking a different combination of such features, and/or undertaking additional features than those features explicitly listed. Scope should, therefore, be determined with reference to the appended claims, along with the full scope of equivalents to which such claims are entitled.

What is claimed is:

1. An apparatus, comprising:
    a camera module to:
        sample light at a camera frame rate for a sampling period sufficient to collect multiple input image frames, the light emitted by a source display and associated with one or more display pixels having a source pixel wavelength that is output with a variable amplitude modulation rate;
        detect the source pixel wavelength having a first amplitude in a number frames within the sampling period, the number varying as a function of the modulation rate; and
    an image processing module coupled to the camera module to:
        determine one or more logic levels associated with one or more pixels of the input image frame based on the number of frames having the first amplitude within the sample period;
        determine a hidden pixel value encoded by the one or more logic levels; and
        generate an output image frame from the input image frame by assigning the hidden pixel value to one or more pixels of the output image frame.

2. The apparatus of claim 1, wherein the camera module is to detect shift modulation artifacts of temporal aliasing between the camera frame rate and a pixel output modulation frequency.

3. The apparatus of claim 2, wherein:
    the source pixel amplitude varies between the first amplitude and a second amplitude at modulation frequencies that shift between two or more frequencies exceeding the camera frame rate; and
    the image processing module is to:
        decode a stream of the logic levels as a function of the pixel output frequency shifts
        and
    generate the output image frame by assigning the hidden pixel value as the color of one or more pixels of the output image associated with one or more pixels of the camera module that sampled the source pixel wavelength.

4. The apparatus of claim 1, wherein the apparatus further comprises at least one of:
    an electronic memory to store the output image frame; or
    an output panel to output the output image frame.

5. The apparatus of claim 1, wherein the image processing module is to:
    decode a first logic level associated with the one or more pixels of the input image frame in response to the sampling rate being different than a pixel output modulation rate by a first amount;
    decode a second logic level associated with the one or more pixels of the input image frame in response to the sampling rate being different than a pixel output modulation rate by a second amount, different than the first amount; and
    determine the hidden pixel value encoded by at least the first and second logic levels.

6. The apparatus of claim 1, wherein:
    the camera module is to spatially map raw pixel values over a plurality of pixels comprising each of the input image frames, wherein each of the raw pixel values are associated with samples of the light emitted by one or more display pixels having a source pixel wavelength that is output with a variable amplitude modulation rate;
    the imaging processing module is to determine logic levels associated with individual ones of the input image frame pixels based on the number of frames in which those pixels have the first amplitude within the sample period; and
    generate the output image frame by assigning a pixel color identified by the hidden pixel value to each output image frame pixel corresponding to an input image pixel from which the hidden value was determined.

7. The apparatus of claim 6, wherein the image processing module is to retain the raw pixel value in a subset of the output image frame pixels corresponding to input image frame pixels for which there is no hidden data.

8. A method for determining a pixel value, the method comprising:
    sampling light at a camera frame rate for a sample period sufficient to collect multiple input image frames, the light emitted by a source display and associated with one or more display pixels having a source pixel wavelength that is output with a variable amplitude modulation rate;

detecting the source pixel wavelength having a first amplitude in a number frames within the sample period, the number varying as a function of the modulation rate;

determining one or more logic levels associated with one or more pixels of the input image frame based on the number of frames having the first amplitude within the sample period;

determining a hidden pixel value encoded by the one or more logic levels; and generating an output image frame from the input image frame by assigning the hidden pixel value to one or more pixels of the output image frame.

9. The method of claim 8, wherein determining the one or more logical levels further comprises:

decoding a first logic level associated with the one or more pixels of the input image frame in response to the sampling rate being different than a pixel output modulation rate by a first amount;

decoding a second logic level associated with the one or more pixels of the input image frame in response to the sampling rate being different than a pixel output modulation rate by a second amount, different than the first amount; and determining the hidden pixel value encoded by at least the first and second logic levels.

10. The method of claim 8, further comprising:

spatially mapping raw pixel values over a plurality of pixels comprising each of the input image frames, wherein each of the raw pixel values are associated with samples of the light emitted by one or more display pixels having a source pixel wavelength that is output with a variable amplitude modulation rate;

determining logic levels associated with individual ones of the input image frame pixels based on the number of frames in which those pixels have the first amplitude within the sample period; and generating the output image frame further comprises assigning a pixel color identified by the hidden pixel value to each output image frame pixel corresponding to an input image pixel from which the hidden value was determined.

11. The method of claim 10, wherein generating the output image frame further comprises retaining the raw pixel value in a subset of the output image frame pixels corresponding to input image frame pixels for which there is no hidden data.

12. One or more non-transitory computer readable media including instructions stored thereon, which when executed by a processing system, cause the system to perform a method comprising:

sampling light at a camera frame rate for a sample period sufficient to collect multiple input image frames, the light emitted by a source display and associated with one or more display pixels having a source pixel wavelength that is output with a variable amplitude modulation rate;

detecting the source pixel wavelength having a first amplitude in a number frames within the sample period, the number varying as a function of the modulation rate;

determining one or more logic levels associated with one or more pixels of the input image frame based on the number of frames having the first amplitude within the sample period;

determining a hidden pixel value encoded by the one or more logic levels; and generating an output image frame from the input image frame by assigning the hidden pixel value to one or more pixels of the output image frame.

13. The media of claim 12, further comprising instructions stored thereon, which when executed by a processing system, cause the system to perform a method further comprising:

decoding a first logic level associated with the one or more pixels of the input image frame in response to the sampling rate being different than a pixel output modulation rate by a first amount;

decoding a second logic level associated with the one or more pixels of the input image frame in response to the sampling rate being different than a pixel output modulation rate by a second amount, different than the first amount and determining the hidden pixel value encoded by at least the first and second logic levels.

14. The media of claim 12, further comprising instructions stored thereon, which when executed by a processing system, cause the system to perform a method further comprising:

spatially mapping raw pixel values over a plurality of pixels comprising each of the input image frames, wherein each of the raw pixel values are associated with samples of the light emitted by one or more display pixels having a source pixel wavelength that is output with a variable amplitude modulation rate;

determining logic levels associated with individual ones of the input image frame pixels based on the number of frames in which those pixels have the first amplitude within the sample period; and generating the output image frame further comprises assigning a pixel color identified by the hidden pixel value to each output image frame pixel corresponding to an input image pixel from which the hidden value was determined.

15. The method of claim 14, wherein generating the output image frame further comprises retaining the raw pixel value in a subset of the output image frame pixels corresponding to input image frame pixels for which there is no hidden data.

* * * * *